US011625800B2

(12) United States Patent
Thibout et al.

(10) Patent No.: US 11,625,800 B2
(45) Date of Patent: Apr. 11, 2023

(54) METHODS AND SYSTEMS FOR VISUALIZING MEDIA RIGHTS MANAGEMENT

(71) Applicant: B Media Finance, Paris (FR)

(72) Inventors: Joël Thibout, Paris (FR); Jean Roman, Brooklyn, NY (US); Philippe De Martelaere, Paris (FR)

(73) Assignee: B Media Finance, Paris (FR)

( * ) Notice: Subject to any disclaimer, the term of this patent is extended or adjusted under 35 U.S.C. 154(b) by 1145 days.

(21) Appl. No.: 14/265,144

(22) Filed: Apr. 29, 2014

(65) Prior Publication Data

US 2014/0324710 A1    Oct. 30, 2014

Related U.S. Application Data

(60) Provisional application No. 61/817,201, filed on Apr. 29, 2013.

(51) Int. Cl.
*G06Q 50/18* (2012.01)
*G06Q 10/00* (2023.01)

(52) U.S. Cl.
CPC ........... *G06Q 50/184* (2013.01); *G06Q 10/00* (2013.01)

(58) Field of Classification Search
CPC ............................ G06Q 50/184; G06Q 10/00
USPC ............................................................. 705/1
See application file for complete search history.

(56) References Cited

U.S. PATENT DOCUMENTS

| 2010/0131558 | A1  | 5/2010 | Logan et al. |
| 2010/0223104 | A1* | 9/2010 | Patel ................. G06Q 30/0283 |
|  |  |  | 707/723 |
| 2012/0246066 | A1* | 9/2012 | Rice ...................... G06Q 20/08 |
|  |  |  | 705/39 |

FOREIGN PATENT DOCUMENTS

| EP | 1062605 A1 | 12/2000 |
| WO | WO1999/060461 A1 | 11/1999 |

OTHER PUBLICATIONS

Cinando, a database that complies, stores, and maintains contact information relating to people and companies, as well as films, movies, and television shows. See www.cinando.com, data retrieved as of Dec. 8, 2014.

(Continued)

*Primary Examiner* — Zeshan Qayyum
(74) *Attorney, Agent, or Firm* — Finnegan, Henderson, Farabow, Garrett & Dunner LLP

(57) ABSTRACT

Methods and systems of rights management are disclosed. These methods and systems enable rights-holders to display, simulate, or track allocations relating to a project. Consistent with the disclosure, the methods and systems may display visualizations of allocations, modify allocations, and display updated visualizations incorporating these modifications. The visualizations may include waterfall charts with selectable boxes associated with grants of rights. The grants of rights may include a grant component, a geographic territory component, and a bundle of rights component. Consistent with the disclosure, the methods and systems may include displaying icons corresponding to a plurality of streams specified in the linked contracts; receiving a selection of certain icons; displaying a corresponding list of controls; receiving simulation assumptions; and displaying a first allocation for rights holders associated with the streams corresponding to the indicated icons.

16 Claims, 30 Drawing Sheets

(56) References Cited

OTHER PUBLICATIONS

Rentrak, a database that compiles, stores, and maintains information relating to movies, films, and television shows, and companies and people. See www.rentrak.com, data retrieved as of Dec. 8, 2014.

* cited by examiner

DISTRIBUTION

| | | | | | |
|---|---|---|---|---|---|
| 2011-05-02 | Financing, Sale | Blue+ PayTV Network | France | Licence (outright) - Pay TV | 1 150 000,00 € |
| 2012-01-15 | Sale | My Aussie Distrib | Australia-NZ | Licence (commission) - Theatrical, Anci... | 0,00 $ |
| 2011-10-20 | Distribution, Sale | My Anglo-US Indie Distributor | United States - Canada - Australia - Ne... | Licence (commission) - Theatrical, Vide... | 1 500 000,00 $ |
| 2012-05-25 | Sale | my Russian dist Co | Russia, Asia copy | Licence (commission) - Video / VOD, TV... | 350 000,00 $ |
| 2012-05-24 | Sale | Brasil Pictures | South America | Licence (commission) - Theatrical, Vide... | 150 000,00 $ |
| 2011-10-30 | Sale | AsianTely | Asia | Licence (outright) - Video - game adap... | 300 000,00 € |
| | | | | Subtotal (€) | 3 500 000,00 € |
| | | | | Subtotal ($) | 1 050 000,00 $ |
| | | | | GRAND TOTAL (€) | 4 025 000,00 € |

Fig. 26

MY CONTRACTS

| Date | Contract | Party | Counterparty | Category |
|---|---|---|---|---|
| 2010-01-01 | Writer Agreement | Awarded Writer | Production Co Paris | Talent |
| 2011-03-03 | Director's agreement | First T Director | Production Co London | Talent |
| 2011-03-01 | French TV/Vid/VoD Agreement | Production Co Paris | The Second Best Distributor in Fran | Distribution, Financing |
| 2011-04-01 | Regional Funding Agreement | Production Co Paris | Generous Regional Film Commission | Financing |
| 2011-04-11 | UK Equity Agreement | Production Co London | TheCity Film Equityfund | Coproduction, Financing |
| 2011-05-02 | French TV presale | Production Co Paris | Blue+ PayTV Network | Financing, Sale |
| 2011-05-20 | Sales Agency Agreement | Production Co London | The Best Sales Agent | International sales |
| 2011-10-20 | UK/Eire-US/CAN-Austr/NZ dist Agreement | Production Co London | My Anglo-US Indie Distributor | Distribution, Sale |
| 2011-10-30 | Asian Merch license | The Best Sales Agent | AsianToy | Sale |
| 2011-12-02 | Coproduction Agreement | Production Co Paris | Production Co London | Coproduction |
| 2012-01-15 | Australian-NZ sub-license | My Anglo-US Indie Distributor | My Aussie Distrib | Sale |
| 2012-05-24 | SouthAmerican Sale agreement | The Best Sales Agent | Brasil Pictures | Sale |
| 2012-05-25 | CIS Sale | The Best Sales Agent | my Russian dist Co | Sale |
| 2013-10-09 | K auteur test | Un Auteur | Pyramide Productions | Talent |
| 2013-10-09 | K réalisateur test | Un Réalisateur | Pyramide Productions | Talent |

Fig. 27

STATEMENTS AND DISTRIBUTION REPORTS

STATEMENT

Film: MY INTERNATIONAL SALES HIT

As of: 2014-04-28

From: 2011-04-13 TO 2014-04-30

| | As of 2011-04-12 | From 2011-04-13 To 2014-04-30 | Total |
|---|---|---|---|
| World except France: * (All rights) | | 10 500,00 € | 10 500,00 € |
| Amounts collected by The Best sales agent | | | |
| The Best sales agent | | | |
| Commission fee: | | | |
| • 15% of Gross receipts until Share of revenues (Equity Fund) | | | |
| • 25% of Gross receipts | | 1 575,00 € | 1 575,00 € |

Fig. 29

RECORDS AND AVAILABILITIES

Film: MY INTERNATIONAL SALES HIT

As of: 2014-04-28

| Territories | Status | Buyer | Buyer name | Rights | Contract amount | Period | Doc |
|---|---|---|---|---|---|---|---|
| Italy | Licence (commission) | | Italian Buyer | Cinematic, Video, Television | 100 000,00 € | 2014-01-21 to 2024-01-21 | ✓ |
| | Licence (outright) | | Italian TV | Television | 50 000,00 € | 2014-03-01 to 2024-03-01 | ✓ |
| | Available | | n/a | Internet / VoD, Ancillary, Reserved, Collection societies, Others | n/a | n/a | n/a |
| | Available | | n/a | All rights | n/a | n/a | n/a |
| Rest of the world Russia, CIS | Licence (outright) | | CIS PTV | Television | 200 000,00 € | 2014-01-21 to 2017-01-21 | ✓ |
| | Available | | n/a | Cinematic, Video, Internet / VoD, Ancillary, Reserved, Collection societies, Others | n/a | n/a | n/a |
| United States | Licence (commission) | | US Buyer | Cinematic, Video, Internet / VoD | $1 000 000,00 | 2014-01-21 to 2029-01-21 | ✓ |
| | Available | | n/a | Television, Ancillary, Reserved, Collection societies, Others | n/a | n/a | n/a |

Fig. 30

METHODS AND SYSTEMS FOR VISUALIZING MEDIA RIGHTS MANAGEMENT

RELATED APPLICATIONS

This application claims the benefit of U.S. Provisional Application No. 61/817,201, filed Apr. 19, 2013, which is hereby incorporated by reference in its entirety.

FIELD OF THE DISCLOSURE

Inventions described herein relate to systems and methods for media content and rights management in general, and film content and rights management in particular.

BACKGROUND OF THE DISCLOSURE

Producing and distributing a motion picture involves a wide array of rights-holders, including but not limited to writers, directors, actors, financiers, production companies, and distribution companies.

Negotiating the allocation of the rights to a film between the various rights-holders can be a complex and time-consuming process. For instance, the terms of an agreement may include geographical restrictions on where the film may be shown and restrictions on the type of media. The split of the revenues may also depend on the gross receipts and the costs associated with the film. There may be a hierarchy of rights-holders, where one party's profits are split among several other parties.

Some existing systems for managing licensing agreements between the rights-holders focus on films where the agreements are already fixed. For instance, Logan et al. in U.S. Patent Publication 2010/0131558 A1 discloses a system and method for storing and managing copyright licensing, where a device determines the licensing status of a business performing a selected copyrighted work. Berstis et al. in WO Patent Publication 1999060461 A1 discloses a method for facilitating royalty collection for copyrighted digital materials. Finally, Burns et al. in EP Patent Publication 1062605 A1 disclose a management method for accessing an online rights database, which allows a user to analyze the license rights for a particular work in a particular territory. However, none of these systems allows the user to fully visualize the chain of rights, budget and financing plans, revenue splits, payment schedules, sales and distribution reports, rights records and availabilities on a requested territory, and other information that would enable all parties in a film agreement negotiation to easily understand the consequences of a proposed agreement.

Thus, there is a need for a computerized method wherein right-holders may visualize the film partition of rights and allocation of revenues, modify the various information graphically, and see the effects of the modifications on the contractual terms and revenue outcome. Such a method may also be extended to media content other than films, such as television and music, or any type of project that is governed by a variety of financing sources and subject to revenue sharing.

SUMMARY OF THE DISCLOSURE

The present disclosure is directed towards methods for media content and rights management in general, and film content and rights management in particular. Embodiments consistent with the present disclosure relate to a web application for visualizing film rights management. In one embodiment, a method for film content and rights management comprises allowing a user to select a film from a database and to display a waterfall chart of the allocation of potential, actual, or simulated receipts for the selected film, wherein the chart uses contractual information to determine the allocation of receipts among various parties given the receipts and expenses. In another embodiment, the method further comprises allowing the user to adjust a component of the waterfall and automatically adjusting the waterfall chart in response to the adjustment. In another embodiment, the method further comprises allowing the user to set one or more revenues and automatically adjusting the waterfall chart in response to setting the revenues. In another embodiment, the method further comprises allowing the user to select a particular geographic territory and a certain set of rights. In another embodiment, the method further comprises displaying a chain of rights for a selected film, wherein the chain of rights is displayed as a tree of the contractual links between all the profiles and companies which participate in the making and exploiting of the film. In another embodiment, the method further comprises recentralizing the tree on a particular rights-holder to show all the contracts that rights-holder has signed when the user clicks on that particular rights-holder. In another embodiment, the method further comprises allowing the user to enter contractual information. In another embodiment, the method further comprises displaying a calendar centralizing all the events related to the selected film (development, production, distribution and exploitation). In another embodiment, the method further comprises displaying budget and financing plans. In another embodiment, the method further comprises displaying all assigned rights of any selected film(s) in any country or territory, including if needed an associated printable sales statement. In another embodiment, the method further comprises allowing the user to view sales and distribution printable statements.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings:

FIG. 26 depicts a list of exploitation contracts for a selected film consistent with disclosed embodiments.

FIG. 27 depicts a list of contracts for a selected film.

FIG. 29 depicts an exemplary view of the statement and distribution record for a selected film in various territories around the world.

FIG. 30 depicts an exemplary view of record and availabilities of rights in a requested territory.

DETAILED DESCRIPTION OF THE EMBODIMENTS

Reference will now be made in detail to the embodiments of the present disclosure described below and illustrated in the accompanying drawings. Wherever possible, the same reference numbers will be used throughout the drawings to refer to same or like parts.

Figure 1:
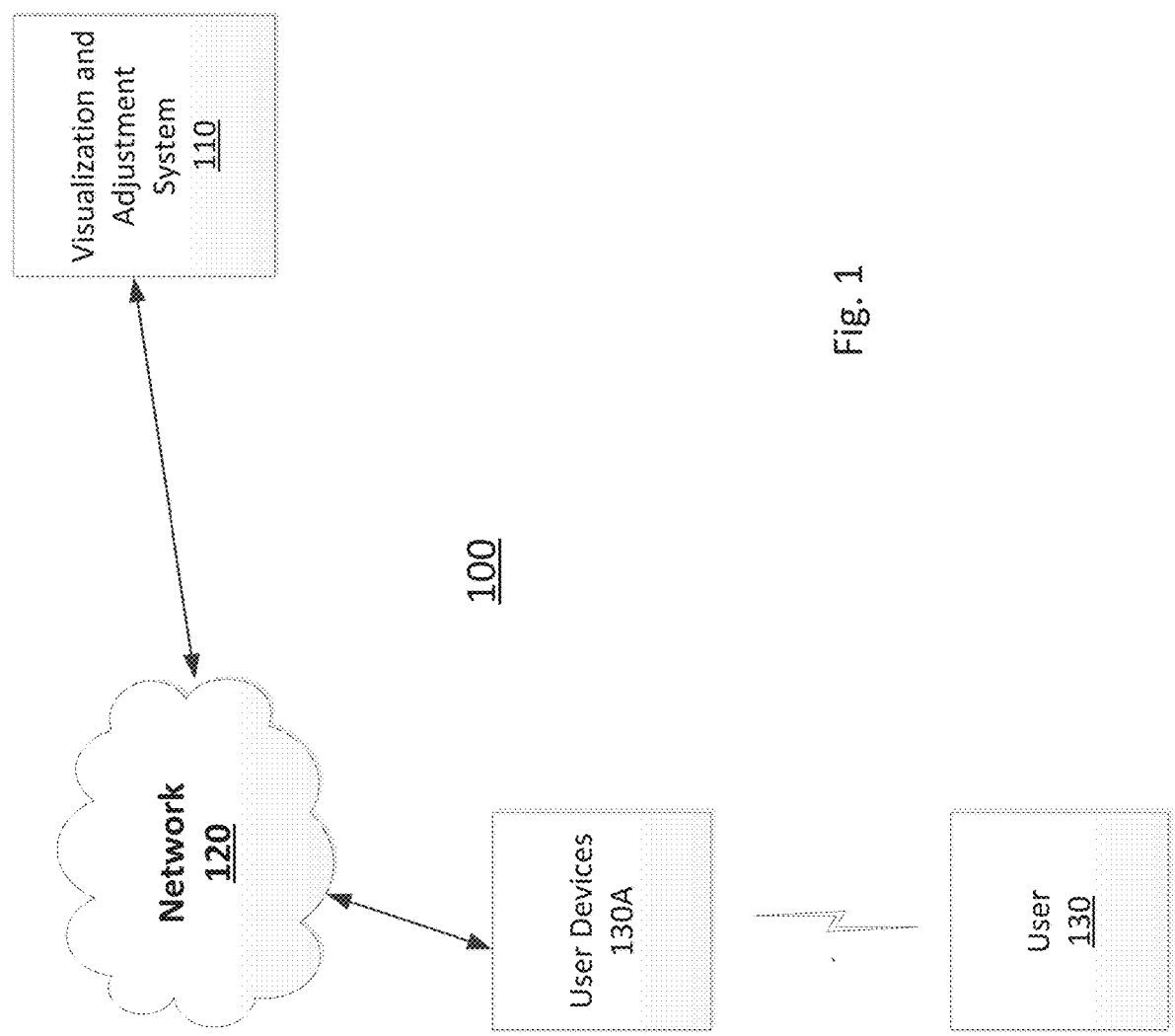
FIG. 1 depicts a system for media rights management.

FIG. 1 depicts a system for media rights management consistent with disclosed embodiments. Embodiments consistent with the present disclosure relate to a web application for visualizing media content and rights management in general, and film content and rights management in particular. The description and figures in the present disclosure are directed towards the film industry specifically, though similar methods and tools may be applied to the management of any media content with multiple rights-holders, such as television and music. The components and arrangement of the components described in connection with FIG. 1 may vary without departing from the scope of the disclosed embodiments. In certain embodiments, system 100 may include a Visualization and Adjustment System 110, a network 120, and a user device 130A. In some embodiments, user 130 may use user device 130A to access system 100. In such embodiments, user 130 may use components of system 100 to access centralized content, chain of rights, budget and financing, revenue split, payment schedule, and sales and distribution information consistent with disclosed embodiments. In some such embodiments, system 100 may provide this information to user device 130A for display to user 130 in graphic form.

Consistent with disclosed embodiments, user 130 may use components of system 100 to create and track contracts in an intuitive and visual manner. In some embodiments, system 100 may receive contractual data provided by user 130 through a password-protected interface. In such embodiments, this contractual information may involve some bundle of rights relating to the film project. In some embodiments, such a bundle of rights may be defined at least by an amount of consideration, a type of grant, a geographic area, a language, and a specific bundle of rights associated with the film project. As a non-limiting example, this contractual information may concern transfers of rights or complex studio deals.

Consistent with disclosed embodiments, system 100 may automatically link contracts relating to one of more film projects. In such embodiments, system 100 may provide user 130 through user device 130A visualizations based on the linked contracts. In some embodiments, system 100 may provide an immediate visualization of rights concerning a film project. In some embodiments, this immediate visualization may be a geographic visualization. For example, this geographic visualization may be a map displaying territories and rights information in response to user input. In some embodiments, the rights information may concern primary rights, such as theatrical rights, video or video on demand rights, television rights, or other ancillary rights to the film. In other embodiments, this geographic visualization may concerns secondary or derived rights, such as rights to literature adaptions, music rights, merchandising, remakes, sequels, spinoffs, or video game adaptions. In some embodiments, the geographic visualization may provide a list of contracts associated with a territory in response to user input. In alternative embodiments, this immediate visualization may be a tabular visualization. In these embodiments, the tabular visualization may concern recorded rights and available rights. In some embodiments, the displayed recorded and available rights may be associated with a geographic territory. For example, system 100 may provide to user device 130A for display to user 130 a list of the recorded and available rights relating to a film project for France.

In other embodiments, system 100 may provide to user device 130A for display to user 130 a simple, immediate visualization of a complex revenue-sharing model. In some embodiments, this complex model relates to a single film project. In alternative embodiments, this complex model relates to multiple film projects. In certain embodiments, the complex model may concern allocation of receipts from multiple corridors of revenue to multiple rights-holders. Each revenue corridor may be associated with a contract between rights-holders. In such embodiments, user 130 may access system 100 through user device 130A to obtain revenue-sharing simulations under varying assumptions. In some embodiments, such revenue-sharing simulations may concern contracts under negotiation. In these embodiments, responsive to the request of user 130, system 100 may provide user 130 through user device 130A an immediate visualization of the effect of a potential contract structure upon the allocation of revenue from the film project. In some embodiments, the allocation of receipts, revenues, or other financial information may be displayed as waterfall diagrams that graphically illustrate this allocation to all the financial contributors to the production of a film, by order of priority. In other embodiments, responsive to the request of user 130, system 100 may provide user 130 through user device 130A, or third parties through other user devices, reports or tracking information concerning the receipt and allocation of revenues associated with a film project. In some embodiments, system 100 may be configured to store the visualizations and financial information produced according to the disclosed embodiments. In some embodiments, system 100 may provide user 130 through user device 130A stored visualizations and financial information upon receipt of a request for such information from user 130.

In some embodiments, system 100 may automatically generate production and distribution calendars consistent with the disclosed embodiments. For example, system 100 may generate Gantt charts based on the linked contracts relating to the one of more film projects (as shown in a non-limiting example in FIG. 14). In some embodiments, these Gantt charts may automatically incorporate conditions precedent specified in contractual data received by the system 100 from the user 130 through the user device 130A.

Visualization and Adjustment System 110 may be a system configured to provide and/or manage media rights consistent with the disclosed embodiments. Visualization and Adjustment System 110 may be one or more computing systems configured to execute software instructions stored on one or more memory devices to perform one or more operations consistent with the disclosed embodiments. In one embodiment, visualization and adjustment system 110 may include one or more servers, which may be one or more computer devices configured to execute software instructions stored in memory to perform one or more processes consistent with the disclosed embodiments. For example, visualization and adjustment system 110 may include one or more memory device(s) storing data and software instructions and one or more processor(s) configured to use the data and execute the software instructions to perform server-based functions and operations known to those skilled in the art. Visualization and adjustment system 110 may include one or more computers. In certain embodiments, visualization and adjustment system 110 may be configured as a particular apparatus, system, and the like based on the storage, execution, and/or implementation of the software instructions that perform one or more operations consistent with the disclosed embodiments. Visualization and adjustment system 110 may be standalone, or it may be part of a subsystem, which may be part of a larger system. For example, visualization and adjustment system 110 may represent distributed servers that are remotely located and communicate over a network (e.g., network 120) or a dedicated network, such as a LAN.

Visualization and adjustment system 110 may include or may connect to one or more storage devices configured to store data and/or software instructions used by one or more processors of visualization and adjustment system 110 to perform operations consistent with disclosed embodiments. For example, data provided by user 130 may be stored on a secure hosted server. As an additional example, visualization and adjustment system 110 may include memory configured to store one or more software programs that performs several functions when executed by a processor. The disclosed embodiments are not limited to separate programs or computers configured to perform dedicated tasks. For example, visualization and adjustment system 110 may include memory that stores a single program or multiple programs. Additionally, visualization and adjustment system 110 may execute one or more programs located remotely from visualization and adjustment system 110. For example, visualization and adjustment system 110 may access one or more remote programs stored in memory included with a remote component that, when executed, perform operations consistent with the disclosed embodiments. In certain aspects, visualization and adjustment system 110 may include web server software that generates, maintains, and provides web site(s) that are accessible over network 120. In other aspects, visualization and adjustment system 110 may connect separate web server(s) or similar computing devices that generate, maintain, and provide web site(s) for a service provider associated with visualization and adjustment system 110. Visualization and adjustment system 110 may be accessed by user 130 through user device 130A from any web browser, including Safari, Internet Explorer, Google Chrome, and Mozilla Firefox.

A distribution account provider associated with visualization and adjustment system 110 may provide revenue allocation services consistent with the disclosed embodiments. In some aspects, the distribution account provider may employ visualization and adjustment system 110 to draft an agreement for distribution of revenues related to a film project on the basis of contracts relating to a film project. In other aspects, the distribution account provider may employ visualization and adjustment system 110 to collect, track, and distribute revenues related to a film project.

Network 120 may be configured to provide communications between components of FIG. 1. For example, network 120 may be any type of network (including infrastructure) that provides communications, exchanges information, and/or facilitates the exchange of information, such as the Internet, a Local Area Network, or other suitable connection(s) that enables system 100 to send and receive information between the components of system 100.

In certain embodiments, user device 130A may be a system enabling user 130 to communicate with other components of system 100. User 130 may operate user device 130A, or direct operation of user device 130A, consistent with disclosed embodiments. User device 130A may include, but is not limited to, a computer, mainframe, or mobile computing device. Such a mobile computing device may include, but is not limited to, a cell phone, smart phone, personal digital assistant, game device, tablet, or laptop.

In some embodiments, user 130 may be a rights-holder associated with the film project, such a writer, composer, musician, actor, sales agent, investor, financer, distributor, producer, or co-producer, or any holder of a share in the receipts of the film project, or a third party. In certain aspects, user 130 may interact with system 100 through user device 130A to manage rights associated with the film project. For example, user 130 may be a scriptwriter who interacts with system 100 through a smartphone to obtain an immediate visualization of his allocation of revenues for a film project under a proposed complex revenue model. As an additional example, user 130 might be an employee of a production company who interacts with system 100 through a desktop computer to obtain an immediate geographic or tabular visualization of allocated rights. As a further example, user 130 might be a sales agent who interacts with system 100 through a tablet computer to update revenue and expense figures associated with distribution deals and to generate reports based on this entered data and the complex revenue model for other rights-holders.

Figure 2:
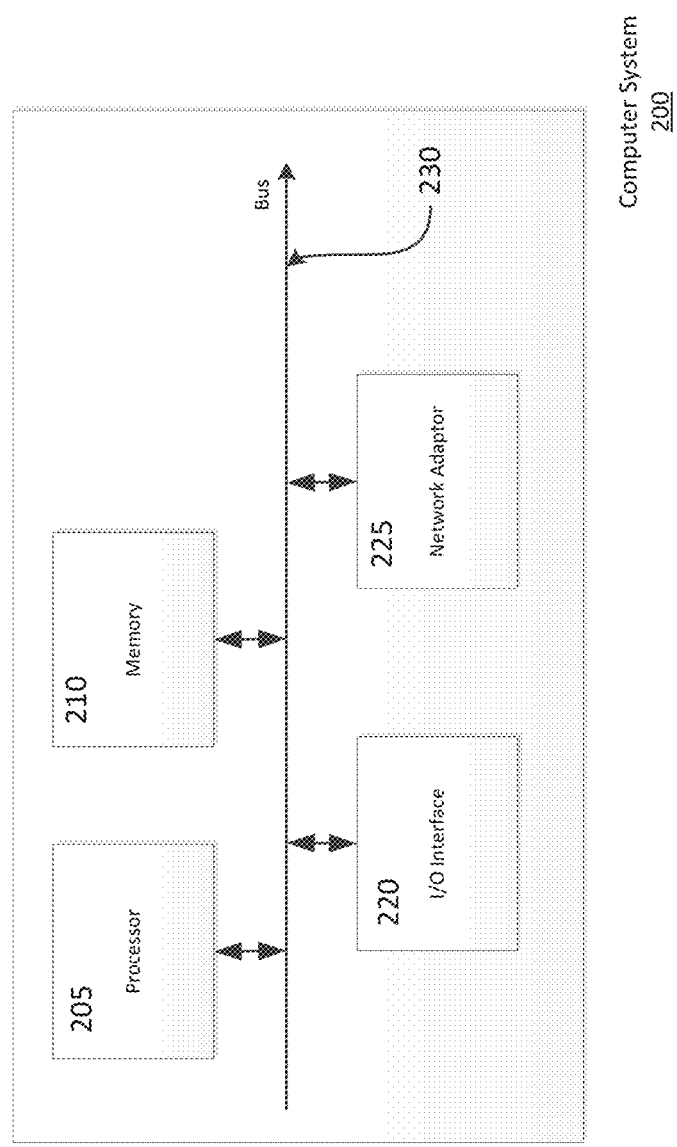
FIG. 2 depicts an exemplary component of the system illustrated in FIG. 1.

FIG. 2 shows a block diagram of computer system 200, which may be associated with visualization and adjustment system 110 and may be configured to perform one or more processes consistent with disclosed embodiments. According to some embodiments, computer system 200 includes a processor 205, memory 210, I/O interface(s) 220, and network adapter 225. These units may communicate with each other via bus 230, or wirelessly. The components shown in FIG. 2 may reside in a single device or multiple devices.

In various embodiments, processor 205 may be a microprocessor or a central processor unit (CPU) performing various methods consistent with these embodiments. Memory 210 may include a computer hard disk, a random access memory (RAM), a removable storage, or a remote computer storage. In various embodiments, memory 210 stores various software programs executed by processor 205. Network adapter 225 enables device 200 to exchange information with external networks. In various embodiments, network adapter 225 includes a wireless wide area network (WWAN) adapter, or a local area network (LAN) adapter. I/O interfaces 220 may include keyboard, a mouse, an audio input device, a touch screen, or an infrared input interface.

In some embodiments, computer system 200 may communicate using network adapter 225 over network 120 with a database storing contact and film information such as Cinando or Rentrak (not shown). In some embodiments, user interface controls disclosed herein accepting user input may be pre-populated using information retrieved from such a database or memory 210. In certain embodiments, entering text into user interface controls disclosed herein accepting user input may prompt autocompletion of the entered text based on information retrieved from such a database or memory 210.

Figure 3:
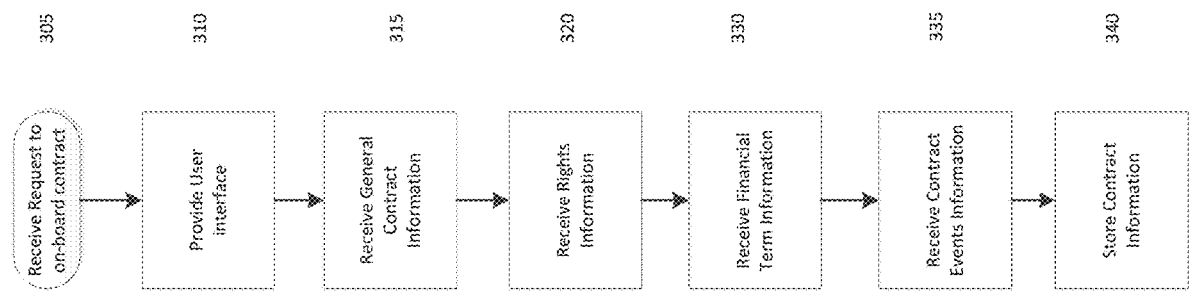
FIG. 3 depicts a flowchart of an exemplary method for on-boarding contract information.

FIG. 3 depicts a flowchart of an exemplary method for on-boarding contract information. These steps present an illustrative embodiment: neither the sequence nor the presence or absence of steps is intended to limit the disclosed systems and methods. In one embodiment, computer system 200 (e.g., associated with visualization and adjustment system 110) may receive a request from user 130 through user device 130A to on-board a contract consistent with disclosed embodiments (step 305). In some embodiments, the request for on-boarding may concern an existing contract between rights-holders, or may concern a proposed contract between rights-holders. In some embodiments, user 130 may generate the request by selecting an icon in a user interface provided by visualization and adjustment system 110 to user device 130A. For example, user 130 may select the icon by clicking a button on a computer mouse or gesturing on a touch-screen.

In some embodiments, computer system 200 may provide a user interface in response to the request to on-board a contract (step 310). For example, the visualization and adjustment system 110 may provide to user device 130A for display a plurality of entry controls consistent with disclosed embodiments. In some embodiments, these entry controls may comprise a general contract information control, a rights control, and a financial terms control. As described in greater detail below, these controls may include tabs, entry fields, drop down menus, and other interface elements known to those of skill in the art. The user may interact with this user interface displayed on user device 130A to provide indication of general contract information to the computer system 200.

In step 315, computer system 200 may receive indications of general contract information from user 130 through user device 130A, consistent with disclosed embodiments. In some embodiments, the general contract information may include the parties to the contract and an indication that the contract is associated with one or more film projects. For example, the user 130 may provide through the user device 130A indications that a contract concerns a first licensor, a second licensor, and a first licensee and that a contract is associated with a first film project and a second film project. As an additional example, the contract may concern a principal granting an agent a license to commercialize designated rights in exchange for a commission on the sales of the agent. In some embodiments, computer system 210 may receive one or more of the following additional general contract information: a contract name; a contract reference; contract tags such as talent, financing, production or co-production, or other tags; currency information; a contract date; and a contract status, such a signed contract, a deal memo, a simulated contract, or a draft. In some embodiments, the computer may be configured to use contract tags for classification of the contract. For example, the user 130 may provide through the user device 130A indications that a contract concerns financing and co-production, and that the contract has been signed.

In step 320, the computer system 200 may receive indications of rights information from the user 130 through the user interface 130A consistent with disclosed embodiments, as described in greater detail below. In some embodiments, the rights information may define the rights granted by a licensor to a licensee under the contract. In certain embodiments, the rights information may be by depicted as one or more trees, the trees having nodes connected by branches (as a non-limiting example, see FIG. 17). For example, nodes for each tree may include one or more of the following: the amount of consideration for a grant of rights, the type of rights granted, the geographic extent of the license, any language restriction on the license, and the specific bundle of rights granted under the license. As an additional example, the user may indicate that a tree of rights includes €100,000 consideration for the grant of a license in Switzerland for French language television performances of the film, and in France for French language theatrical performances of the film. In some embodiments, computer system 200 may be configured to enable branches of the tree of rights to be added, removed, or modified at each level of the tree of rights.

In step 330, computer system 200 may receive financial term information from the user 130 through the user interface 130A consistent with disclosed embodiments, as described in greater detail below. In some embodiments, the complex revenue model may depend on the financial terms of the linked contracts. In such embodiments, the user 130 may interact with user device 130A to provide contract information to computer system 200 as part of constructing the complex revenue model. In some embodiments, computer system 200 may receive financial split information for the contract. In some embodiments, financial split information may include the allocation of revenues associated with a grant of rights. For example, financial split information may include an indication of the revenue corridor, the base upon which payments are calculated, and user-defined thresholds and payment formulas.

In step 335, computer system 200 may receive contractual events information from the user 130 through the user interface 130A consistent with disclosed embodiments. In some embodiments, computer system 200 may receive condition precedent information. In some embodiments, condition precedent information may include an indication of conditions precedent to the enforceability of the contract. For example, the user may indicate that the contract includes delivery of a chain of rights document as a condition precedent to the enforceability of the contract. In other embodiments, computer system 200 may be configured to construct temporal representations based at least in part on condition precedent information from on-boarded contracts. For example, computer system 200 may be configured to construct Gantt charts and calendars based on the dates and conditions indicated by user 130 through user device 130A. In some embodiments, computer system 200 may receive payment information associated with the contract. In some embodiments, payment information may include indications of the amount and scheduled date of payment, together with an indication of whether payment has been received. In certain embodiments, computer system 200 may be configured to construct reports of accrued revenue based at least in part on payment information indicated by user 130 through user device 130A. In some embodiments, computer system 200 may receive contract condition information associated with the contract. In certain aspects, such contract condition information may include notes on additional contract terms and conditions for recordation in the computer system 200.

In step 340, the computer system 200 may be configured to use the processor 105 to store the contract information in the memory 210. In some embodiments, computer system 200 may be configured to store the contract information in response to an indication from the user 130 provided through the user device 130A. In some embodiments, computer system 200 may be configured to use processor 205 to provide the contract information to user device 130A or another device for display, transmission, printing or other another method of outputting data known to one of skill in the art.

Figure 4:
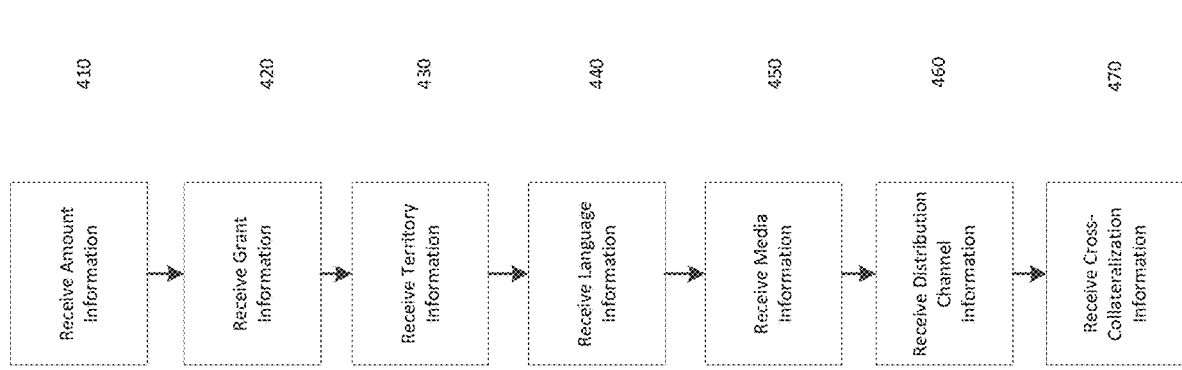
FIG. 4 depicts a flowchart of an exemplary method for providing rights information.

FIG. 4 depicts a flowchart showing a method of providing rights information consistent with the disclosed embodiments. This flowchart presents an illustrative embodiment: neither the sequence nor the presence or absence of steps is intended to limit the disclosed systems and methods. In some embodiments, the computer 200 may receive from the user 130 through the user device 130A rights information. Computer 200 may be configured to use processor 205 to store the received rights information in memory 210. As described above in relation to FIG. 3, the method includes providing information for a tree of rights including at least one of the amount information, grant information, territory information, language information, and media information. The computer 200 may be configured to use the processor 205 to store the received rights information in memory 210. In step 410, the computer system may receive an indication of the amount information from user 130 through the user device 130A, consistent with disclosed embodiments. In some embodiments, this indication may comprise an amount or percentage. For example, the indication may be of an absolute amount, or of a percentage of a selected budget previously associated with the film project. Additionally, in certain embodiments, the user may indicate one or more applicable bonus (or bumper) payments, the payments having an amount and a condition for payment. For example, to indicate a bumper payment, the user may perform one or more of the following steps in some order: selecting an interaction control to add a bumper payment, entering into an entry control an amount of the payment, selecting an existing condition from a drop down menu, or choosing to define a new condition in a text field.

In step 420, the computer system may receive an indication of a grant of rights, consistent with disclosed embodiments. In some embodiments, the user may indicate the grant of rights by selecting a type of grant from a drop down menu. For example, the user may select at least one of the follow grant types: equity grants, such as production or co-production; license grants, such as outright licenses, commission bearing licenses, and royalty bearing licenses; and talent grants, such a talent's underlying rights, and option of talent's underlying rights. In some aspects, corridors of revenue may correspond to types of grant. For example, a distribution license may generate the following corridors of revenues: commission fee, expenses recoupment and minimum guarantee recoupment. In other embodiments, computer system 200 may be configured to implement alternative revenue streams defined by the user. For example, a film may be eligible for a tax credit, or a subsidy, and such tax credit or subsidy may be shared between parties to a contract.

In step 430, the computer system may receive an indication of the geographic extent of the grant of rights, consistent with disclosed embodiments. In some embodiments, this indication may include the selection of at least one geographic unit on a map. In other embodiments, this indication may include entering some of a label for the desired geographic extent in an entry control. In such embodiments, a map may display a geographic representation corresponding to the indicated geographic extent. In certain embodiments, the user 130 may interact with user device 130A to select an interaction control to edit a previously defined geographic extent by adding or subtracting geographic units. In other embodiments, the user 130 may interact with user device 130A to indicate whether the grant of rights includes all languages. For example, the user 130 may interact with the user device 130A to enter "world except Fr" and then select "World except France" from a pop-up menu. In this example, the computer system 200 may provide the user device 130A a graphic for display indicating the selection of every country in the world except France. In an alternative example, the user 130 may interact with user device 130A to cause the computer system 200 to provide the user device 130A for display a list of countries that may be edited to add or remove countries. The user 130 may interact with the user device 130A to indicate that a grant of rights to all languages is desired.

In step 440, the computer system 200 may receive an indication of languages for the grant of rights, consistent with disclosed embodiments. In some embodiments, the computer system 200 may optionally restrict the grant of rights to certain languages, dependent on the geographical extent of the license. For example, if the user 130 has interacted with the user device 130A to select Switzerland as the geographic extent of the grant of rights, the user 130 may have the option to interact with the user device 130A to select at least one of French, German, Italian, and Romansh as languages for the grant of rights.

In step 450, the computer system may receive an indication of the media information, consistent with disclosed embodiments. In some embodiments, the user 130 may interact with the user device 130A to indicate a choice of rights and a duration of rights. For example, the user 130 may interact with the user device 130A to select controls displayed in an expandable tree format for rights such a theatrical rights, video/video on demand rights, TV rights, ancillary rights, and derived or secondary rights, and subcategories of the same. As an additional example the user 130 may interact with the user device 130A to indicate either an absolute start date or a relative start date (e.g. a holdback) for the grant of rights. As a further example, the user 130 may interact with the user device 130A to indicate an absolute ending date, a relative ending date based on the start date, or a perpetual license. In some embodiments, the computer system 200 may provide a notification if the user attempts to secure more rights than the grantor possesses.

In step 460, the computer system may receive an indication of a distribution channel, consistent with disclosed embodiments. In some embodiments, the user 130 may interact with the user device 130A to indicate this distribution channel. For example, a grant of a television license to a licensee may provide for a plurality of revenue streams associated with a plurality of channels, each having different revenue sharing structures. In another example, a grant of merchandising rights may provide for a different revenue sharing structure depending on the sales channel of the merchandise.

In step 470, the computer system may receive an indication of a cross-collateralization relationship, consistent with disclosed embodiments. In some embodiments, this cross collateralization relationship may allow a rights-holder to recoup expenditures associated with one revenue stream using revenue from a different revenue stream. For example, investors in a film project may have the right to recoup their investment from the revenue of that film project and the revenue of another, unrelated film project. As an additional example, in a contract containing a first combination of amount, grant, geographic territory, and media rights and a second combination of amount, grant, geographic territory, and media rights, cross-collateralization permits recoupment of expenditures associated with the first combination using revenue associated with the second combination.

Figure 5:
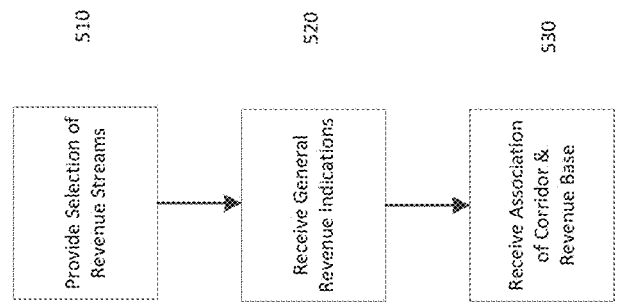
FIG. 5 depicts a flowchart of an exemplary method for associating revenue corridors with revenue bases.

FIG. 5 depicts a flowchart of an exemplary method for associating revenue corridors with revenue bases. This flowchart presents an illustrative embodiment: neither the sequence nor the presence or absence of steps is intended to limit the disclosed systems and methods. In step 510, computer system 200 may be configured to display a partition of revenue streams consistent with disclosed embodiments. In some embodiments, the revenue streams displayed may be based on a partition of media rights information specified in a contract. In certain aspects, a revenue stream may be associated with a particular combination of a territory, a language, and bundle of rights. For example, given a contract granting a commission-based license in the United Kingdom for theatrical rights and in the United States for television rights, computer system 200 may be configured to display a partition of revenue streams by geographic area and by media right.

In step 520, computer system 200 may receive from the user 130 through the user device 130A indications of general revenue information consistent with disclosed embodiments. For example, indications of general revenue information may include indications of the revenue stream for which the split of revenues is defined and whether to display licensing terms or revenue position. In some embodiments, displaying licensing terms shows only the revenue splits arising from the current contract, while revenue position shows all revenue splits relating to that revenue stream, including those arising from other contracts. When in revenue position mode, in some embodiments, the user interface may notify the user 130 if more than 100% of a revenue base has been allocated. In certain aspects, computer system 200 may be configured to receive a recoupment hierarchy indicating a priority of recoupment among rights holders when in revenue position mode.

In step 530, the user 130 may interact with user device 130A to provide computer system 200 indications of an association between a corridor of revenue and a revenue base. In some embodiments, computer system 200 will provide user device 130A for display a user interface with icons depicting corridors of revenue, including without limitation shares of revenue associated with a right, a commission fee, a recoupment of expenses, or a recoupment of a minimum guarantee. In some embodiments, the icons depicting corridors of revenue may be automatically generated based on the type of grant of right, which may include grant of right types received from the user 130 through user device 130A.

In some embodiments, the user interface may display icons depicting revenue bases for calculating payments, including without limitation gross receipts, net receipts, net profit, a corridor of revenues belonging to another rightholder (e.g. the producer's share), or additional user-defined revenue bases. In some embodiments, the icons depicting revenue bases may indicate existing allocations of revenue defined on that revenue basis. For example, the user interface may display a colored bar superimposed upon the icon for the net receipts when a linked contract provides a 20% share of the net receipts to another rights-holder. In certain embodiments, the icons may indicate thresholds affecting the allocations of revenues. In some embodiments, a dimension of the superimposed icon, such as the length of a superimposed bar, may indicate the amount or proportion of the royalty base allocated to a particular corridor of revenue. In some embodiments, the user interface may display multiple corridors of revenue defined on a single revenue base with a superimposed icon showing both the individual and cumulative allocation for that revenue base. In some embodiments, computer system 200 may receive an indication of a corridor of revenue and a revenue base from user 130 through user device 130A. For example, user 130 may interact with user device 130A to click and drag the icon associated with a corridor onto the icon associated with a revenue base.

Figure 6:
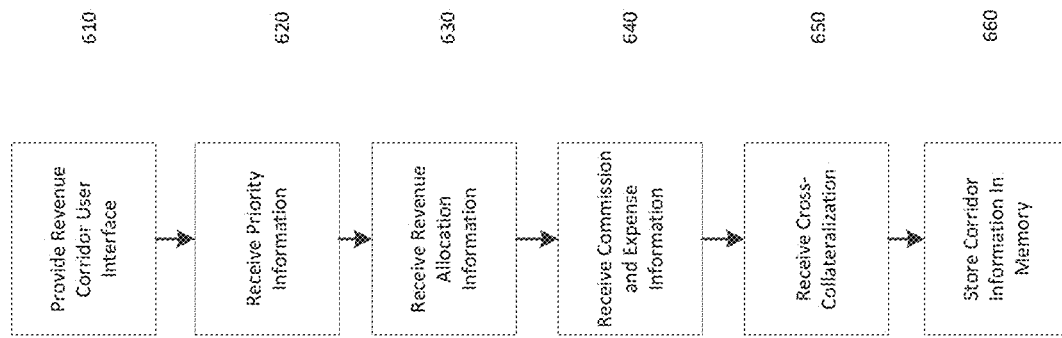
FIG. 6 depicts a flowchart of an exemplary method for defining revenue corridors on revenue bases.

FIG. 6 depicts a flowchart of an exemplary method for defining revenue corridors on revenue bases consistent with disclosed embodiments. This flowchart presents an illustrative embodiment: neither the sequence nor the presence or absence of steps is intended to limit the disclosed systems and methods. In step 610, computer system 200 may provide user device 130A for display a user interface for entering one or more of priority, corridor, cross-collateralization, and commission fee information consistent with disclosed embodiments. In step 620, computer system may receive priority information from user 130 through user device 130A consistent with disclosed embodiments. In some embodiments, priority information may define a relative order of priority for payments to revenue corridors owned by the same rights-holder. For example, given a high priority expense and a low priority minimum guarantee, the expense may be recouped before the minimum guarantee. In certain aspects, priority information may define a relative order of priority between rights holders. For example, the share of a lower-priority rights-holder may be determined from the revenue base remaining after deduction of the share of the higher-priority rights-holder. For example, a first rightsholder with priority over a second rights-holder may be allocated a share of the net receipts. Then the share of the second rights-holder may be determined from the net receipts less the amount of the first rights-holder.

In step 630, computer system 200 may receive revenue allocation information from user 130 through user device 130A consistent with disclosed embodiments. In some embodiments, the revenue allocation instructions may include at least one of corridor instructions. In some embodiments, corridor instructions may define thresholds and assorted allocation percentages (e.g. shares). In some embodiments, thresholds for a corridor may be defined with respect to an amount received for that corridor or for another corridor, which may be associated with an unrelated rights holder. For example, a linked contract may provide a rightsholder a 20% share of net receipts up to €100,000; 10% of net receipts up to €200,000; and finally 5% of net receipts over €200,000. As a further example, a financier of a film project may receive, in exchange for providing financing, an allocation of the revenues dependent in part on the amount of revenues received by a distributor under a separate merchandising agreement.

In step 640, computer system 200 may receive opposable commission fee and recoupable expense instructions consistent with disclosed embodiments. In some embodiments, the opposable commission fee may limit the amount that can be deducted from the gross receipts prior to calculating a right holder's share. For example, when a licensor and a first licensee have agreed to grant the first licensee a 20% opposable commission, if the licensor agrees with a second licensee to a 25% commission on the stream of revenues, the protected first licensee will receive his share as if the commission was 20%, and not the 25% percentage exceeding the opposable commission. In some aspects, recoupable expense instructions may include instructions concerning the amount and type of expenses to be recouped. In some embodiments, some or all receipts may be allocated to recoupable expenses before any receipts are made available for other allocations.

In step 650, computer system 200 may receive cross-collateralization instructions consistent with disclosed embodiments. In some embodiments, cross-collateralization of revenue streams may depend on the structure of the grant of rights in the corresponding linked contracts. In some embodiments, when two branches of a grant of rights share the same amount node, the revenue streams associated with those grants of rights may be automatically cross-collateralized. In certain aspects, computer system 200 may cross-collateralize two grants of rights not sharing the same amount node in response to receiving cross collateralization instructions. In some embodiments, cross-collateralization may permit a revenue corridor defined on one revenue stream to receive revenue from another revenue stream. In step 660, computer system 200 may be configured to store corridor information in memory 210 in response to instructions from user 130 through user device 130A.

Figure 7:
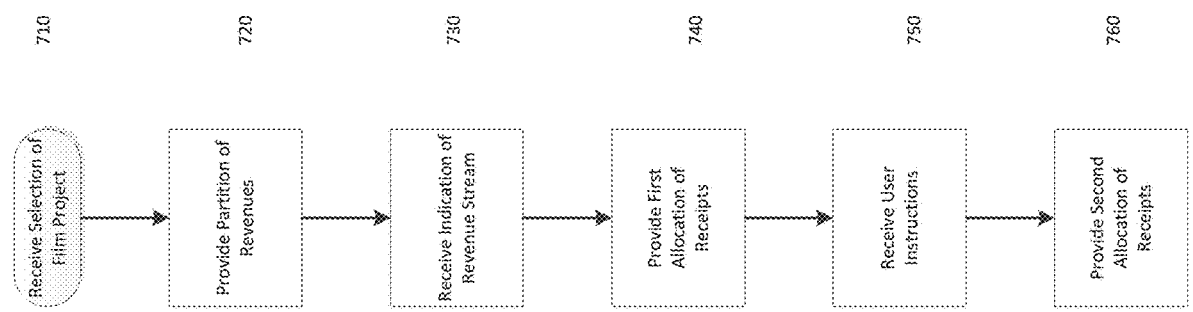
FIG. 7 depicts a flowchart of an exemplary method for visualizing an allocation of revenues.

FIG. 7 depicts a flowchart of an exemplary method for visualizing an allocation of revenues. This flowchart presents an illustrative embodiment: neither sequence nor the presence of the steps is intended to limit the disclosed systems and methods. In step 710, computer system 200 receives an indication of a selected film project from user 130 through user device 130A. In some embodiments, computer system 200 may receive an indication that user 130 has selected the film project from a list control displayed in a user interface on user device 130A. In certain embodiments, this list control may be drop-down menu arranged according to a characteristic of the film project. For example, the list control may display film titles, representative images, or other identifying features. As an additional example, the list control may be sortable by film title, director name, year, and other attributes. In some embodiments, user 130 may select the film project from the list control by clicking a mouse button, using a gesture command, or other manner of user interaction known to those of skill in the art. In some embodiments, selection of the film project may include user 130 entering at least part of the film title into a text entry control displayed on the user interface provided to the user device 130A. Consistent with disclosed embodiments, computer system 200 may provide user device 130A a user interface for display of film project information. In some embodiments, film project information may include credit controls, key date controls, info digest controls, chain of rights control, allocation of receipts controls, and distribution controls.

In step 720, computer system 200 may provide a partition of revenues to user device 130A for display consistent with disclosed embodiments. In some embodiments, the partition of revenues may be based upon the linked contracts. In certain aspects, the revenue streams comprising the partition of revenues may be associated with geographic areas and bundles of media rights.

In step 730, computer system 200 may receive an indication of a selection of a stream of revenues consistent with disclosed embodiments. In some embodiments, this indication may include an indication of a geographic territory and an indication of a bundle of rights. In some embodiments, the indication may be received from user 130 through user device 130A. For example, user 130 may select a control by clicking a mouse button, using a gesture command, or other manner of user interaction known to those of skill in the art.

In step 740, computer system 200 may provide a first allocation of receipts to user device 130A for display consistent with disclosed embodiments. In some embodiments, computer system 200 may be configured to provide the first allocation in response to a received indication. In some embodiments, the indication may be received from user 130 through user device 130A. In certain embodiments, the indication may include the selection by user 130 of a control displayed by user device 130A. For example, user 130 may select a control by clicking a mouse button, using a gesture command, or other manner of user interaction known to those of skill in the art.

Computer system 200 may provide a user interface to user device 130A for display including a waterfall control, a simulation control, and a revenue control consistent with disclosed embodiments. In some embodiments, the computer system 200 may be configured to provide a user interface for displaying and modifying the allocation of receipts associated with a bundle of rights consistent with disclosed embodiments. For example, a user interface for displaying and modifying the allocation of receipts may be provided in response to an indication of the selection of the waterfall control. In other embodiments, the computer system 200 may be configured to provide a user interface for displaying and simulating the total allocated revenue according to one or more linked contracts consistent with disclosed embodiments. For example, a user interface for displaying and simulating the total allocated revenue may be provided in response to an indication of the selection of the simulation control. In further embodiments, the computer system 200 may be configured to provide a user interface for displaying and updating the revenues received by distributors consistent with disclosed embodiments. For example, a user interface for displaying and updating the revenues may be provided in response to an indication of the selection of the revenues control.

Computer system 200 may provide a user interface for displaying and modifying the allocation of receipts associated with a bundle of media rights consistent with disclosed embodiments. In some embodiments, computer system 200 may provide for display by user device 130A controls indicating geographic extent and a bundle of rights associated with a contract. In some embodiments, the provided controls may be based on the linked contracts stored by the computer system in memory 210. In some embodiments, the provided controls may allow selection of a unique combination of geographic extent and rights. As a non-limiting example, given a first contract granting television rights for the whole world excluding France, a second contract granting television rights for France, and a third contract granting theatrical rights and merchandising rights in the United States, Canada, and France, the computer may be configured to provide at least geographical extent controls for selecting (i) the world excluding France, the United States, and Canada, (ii) the United States and Canada, and (iii) France. As an additional non-limiting example, computer system 200 may be configured to provide, in response to an indication user 130 selected the United States and Canada geographic extent, at least media bundle controls for selecting (i) television rights, or (ii) theatrical and merchandising rights.

Computer system 200 may be configured to provide one or more of a waterfall control, an assumptions control, and an allocation breakout consistent with disclosed embodiments. In some embodiments, the waterfall control and the allocation breakout may display content based on the linked contracts and the selected geographic extent and media bundle controls. In some embodiments, the waterfall control, assumptions control, and allocation breakout may be associated with a particular revenue stream. For example, the displayed content of the waterfall control and the allocation breakout may reflect the allocation of receipts based on the grants of rights included in the linked contracts for the chosen geographic extent. In certain embodiments, the associated revenue stream may be an alternative or non-traditional revenue stream, such as a tax credit and subsidy. In some embodiments waterfall control and allocation breakout may be color-coded to indicate rights-holders.

The waterfall control may display a graphical region and an axis consistent with disclosed embodiments. In some embodiments, the graphical region may comprise waterfall thresholds consistent with disclosed embodiments. In some embodiments, the waterfall thresholds may depend in part on the thresholds defined in the linked contracts, as described below in greater detail. In some embodiments, the waterfall thresholds may depend in part on an assumed prints and advertising expenditure. In some embodiments, a default prints and advertising expenditure may be received by computer system 200 from user 130 through user device 130A or determined from the linked contracts stored in memory 210. In certain embodiments, the waterfall thresholds may partition the graphical region horizontally into revenue bars. In some embodiments, the height of at least one revenue bar corresponds to the increment in revenue between the waterfall thresholds defining that revenue bar. In certain embodiments the revenue bars may be partitioned vertically into selectable revenue boxes based on the corridors defined in the linked contracts, as described below in greater detail (as a non-limiting example see FIG. 18). In some embodiments, the width of at least one selectable revenue box may correspond to a share defined in the linked contracts. In some embodiments, the axis may display revenue amounts corresponding to the waterfall thresholds partitioning the graphical region.

The allocation breakout control may display a list of the corridors displayed in the waterfall control consistent with disclosed embodiments. In some embodiments, the list may group corridors according to the revenue base upon which the corridor is defined. In some embodiments, an entry for a corridor may include an indicator associating the entry with at least one revenue box corresponding to that corridor. For example, the entries for the corridors may include a color box enabling the allocation breakout control to serve as a legend for the waterfall control.

The assumptions control may enable adjustment of revenue assumptions affecting the allocation of receipts under the complex revenue model consistent with the disclosed embodiments. In some embodiments, the assumptions control may display sub-controls for adjusting revenue assumptions relating to the complex revenue model. In some embodiments, the sub-controls may include a gross control, a prints and advertising control, a cross-collateralization control, and a contractual events control. Computer system 200 may be configured to simulate the allocation of receipts based in part on values associated with these controls. In some embodiments, the value associated with the gross control may be the gross receipts from exploitation of rights related to the film project. For example, the value associated with the gross control may be the gross receipts for a revenue stream associated with a grant of television rights for the United States and Canada. In some embodiments, the value associated with the prints and advertising control may be the expense of manufacturing and distributing physical prints and of advertising the film project. In certain aspects, the cross-collateralization control may toggle the cross-collateralization of corridors of a stream of revenues with other streams of revenues. For example, given a first corridor of revenues on a first stream of revenues cross-collateralized with a second corridor of revenues on a second stream of revenues, computer system 200 may be configured to provide for display a visualization of the allocation of receipts based on either the sum of the two corridors or only the corridor on the current stream of revenues. In various aspects, the contractual events may enable visualization or simulation of events triggering a bonus related to this stream of revenues. For example, if winning a prize in a film festival is a trigger to a minimum-guarantee on a given stream of revenues, computer system 200 may provide to user device 130A for display a visualization of the allocation of receipts assuming the film won the prize at the film festival.

In some embodiments, computer system 200 may be configured to calculate the waterfall thresholds based on the linked contracts. As a non-limiting example, when a first contract provides for a 20% share of gross receipts until recoupment of a minimum guarantee of €100,000 and 80% of gross receipts until recoupment of expenses of €70,000, and a second contract provides for 20% of gross receipts after recoupment of expenses associated with the first contract and until recoupment of invested capital of €200,000 and 5% of net receipts thereafter, a first threshold may be calculated at €87,500, the amount of receipts when the expenses under the first contract are recouped; a second threshold may be calculated at €500,000, the amount of receipts when the minimum guarantee under the first contract is recouped; and a third threshold may be calculated at €1,087,500, the amount of receipts when the invested capital under the second contract is recouped. In some embodiments, these thresholds would divide the graphical representation into four revenue bars. The first revenue bar would be bounded by zero and the €87,500 first threshold. In some embodiments the first horizontal bar would be divided into a revenue box associated with the minimum guarantee under the first contract and a revenue box associated with the expenses under the first contract. In some embodiments, the width of the revenue box associated with the minimum guarantee under the first contract may correspond to the 20% share of gross revenue granted under the first contract.

The second revenue bar would be bounded by the €87,500 first threshold and the €500,000 second threshold. In some embodiments, the second horizontal bar would be divided into at least a revenue box associated with the minimum guarantee under the first contract and a revenue box associated with the investment under the second contract. In some embodiments, the width of the revenue box associated with the minimum guarantee under the first contract may correspond to the 20% share of gross revenue granted under the first contract and the width of the revenue box associated with the investment under the second contract may correspond to the 20% share of gross revenue granted under the second contract. In some embodiments, a third revenue box may be present corresponding to a remaining share for holders of equity in the film project.

The third revenue bar would be bounded by the €500,000 second threshold and the €1,087,500 third threshold. In some embodiments, the third horizontal bar would be divided into at least a revenue box associated with the investment under the second contract. In some embodiments, the width of the revenue box associated with the investment under the second contract may correspond to the 20% share of gross revenue granted under the second contract. In some embodiments, a second revenue box may be present corresponding to a remaining share for holders of equity in the film project.

The fourth revenue bar would be bounded by the €1,087,500 third threshold and infinity. In some embodiments, the third horizontal bar would be divided into at least a revenue box associated with the investment under the second contract. In some embodiments, the width of the revenue box associated with the investment under the second contract may correspond to the 5% share of net revenue granted under the second contract. In some embodiments, a second revenue box may be present corresponding to a remaining share for holders of equity in the film project.

Computer system 200 may be configured to provide to user device 130A for display a user interface for entering financial split information in response to an indication of user 130 selecting a revenue box. As discussed above with respect to FIG. 5 and in detail with respect to FIG. 6, financial split information may include corridors, a revenue base, one or more thresholds, one or more shares and expense and commission information.

In step 750, computer system 200 may receive instructions to modify the displayed waterfall control. In some embodiments, the instructions may include instructions from user 130 through user device 130A to modify financial split information consistent with disclosed embodiments. For example, computer system 200 may receive an indication to increase the share associated with the second contract described above to 50% of gross receipts after recoupment of expenses associated with the first contract and until recoupment of invested capital of € 200,000. In other embodiments, the instructions may include instructions from user 130 through user device 130A to update the assumption controls consistent with the disclosed embodiments.

In step 760, consistent with disclosed embodiments, computer system 200 may provide a second allocation of receipts in response to instructions to modify the waterfall control. In some embodiments, computer system 200 may provide the second allocation to user device 130A for display based on received financial split information. In certain embodiments, computer system 200 may be configured to provide a user interface for entering financial split information in response to additional user indications. For example, computer system 200 may repeatedly provide updated allocations of receipts in response to continued indications of revenue box selection and receipt of financial split information. In some embodiments, the second allocation of receipts may include a waterfall control having an additional waterfall threshold corresponding to the simulated gross receipts with an additional corresponding revenue amount displayed on the axis. For example, the additional waterfall threshold may partition the graphical region into revenue boxes corresponding to receipts allocated and revenue boxes corresponding to receipts not received under the assumptions of the simulation. In some embodiments, computer system 200 may provide different representations for the revenue boxes corresponding to receipts allocated and the revenue boxes corresponding to receipts not received. For example, the representations of the revenue boxes corresponding to receipts not received may be shaded. In some embodiments, the revised allocation breakout may include an indication of receipts under the assumptions of the simulation. For example, computer system 200 may provide for display the total amount of receipts for the entries in the allocation breakout corresponding to corridors of revenue under the assumptions of the simulation.

In this manner, the exemplary method of FIG. 7 may enable a user with minimal financial or programming expertise to manage the allocation of revenues for a film project. In some embodiments, the user may simulate the allocation of revenues under varying gross revenues and print and advertising assumptions. In other embodiments, the user may visualize and update the revenue allocation of the financial model for the film project.

Figure 8:
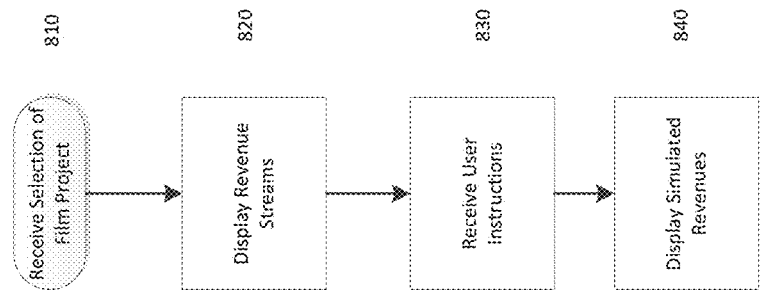
FIG. 8 depicts a flowchart of an exemplary method for simulating revenue for multiple revenues streams according to a financing model.

FIG. 8 depicts a flowchart of an exemplary method for simulating revenue for multiple revenues streams according to a financing model consistent with the disclosed embodiments. This flowchart presents an illustrative embodiment: neither sequence nor the presence of the steps is intended to limit the disclosed systems and methods. In step 810, computer system 200 receives an indication of a selected film project from user 130 through user device 130A. In some embodiments, computer system 200 may receive an indication that user 130 has selected the film project from a list control displayed in a user interface on user device 130A. In certain embodiments, this list control may be drop-down menu arranged according to a characteristic of the film project. For example, the list control may display film titles, representative images, or other identifying features. As an additional example, the list control may be sortable by film title, director name, year, and other attributes. In some embodiments, user 130 may select the film project from the list control by clicking a mouse button, using a gesture command, or other manner of user interaction known to those of skill in the art. In some embodiments, selection of the film project may include user 130 entering at least part of the film title into a text entry control displayed on the user interface provided to the user device 130A. Consistent with disclosed embodiments, computer system 200 may provide user device 130A a user interface for display of film project information. In some embodiments, film project information may include credit controls, key date controls, info digest controls, chain of rights control, allocation of receipts controls, and distribution controls.

In step 820, computer system 200 may provide user device 130A a user interface for simulating revenue for multiple revenue streams consistent with disclosed embodiments. In some embodiments, this user interface may include one or more revenue stream icons. In certain embodiments, the user interface may include a list of one or more revenue stream controls. In various embodiments, the user interface may include a simulation control. Computer system 200 may be configured to simulate the revenue allocation for revenue streams based on indications received from the user device 130A.

Consistent with disclosed embodiments, the revenue stream icons may correspond to the revenue streams defined by the linked contracts. For example, when a contract stored in memory 210 includes a grant of rights of a commission bearing license to distributor, the revenue stream icons may include a revenue stream icon corresponding to the license grant. For example, computer system 200 may be configured to automatically include an icon corresponding to this revenue stream. In some embodiments, computer system 200 may be configured to generate revenue stream icons corresponding to simulated contracts in response to indications received from user device 130A. For example, user 130 may simulate a new contract by selecting a control in the user interface and entering contract information. For example, user 130 may enter one or more of licensor, licensee, minimum guarantee, media rights, and commission and expense information. In some embodiments, computer system 200 may be configured to simulate the allocation of revenue including such a simulated contract in response to user instructions received through user device 130A.

Consistent with disclosed embodiments, the list of revenue stream controls may include one or more revenue stream controls. In some embodiments, the revenue stream controls may correspond to revenue streams defined by the linked contracts. In some embodiments, computer system 200 may be configured to add revenue stream controls to the list based on indications received from user device 130A. Computer system 200 may be configured to simulate revenue allocation based on the revenue streams corresponding to the included revenue stream controls consistent with disclosed embodiments. In some embodiments, the revenue stream controls include entry controls. For example, a revenue stream control may include an entry control for gross revenues for that revenue stream. As an additional example, the revenue stream control may include an entry control for prints and advertising expenses. In some embodiments, computer system 200 may be configured to evaluate the list of revenue stream controls in a specific order. In some embodiments, this evaluation order may reflect a chronological order in which simulated revenues are accrued. For example, a film project may include a movie scheduled for release in a second territory a year after it is released in a first territory. In such a situation, revenues may accrue through revenue streams related to the release in the first territory before accruing through revenue streams related to the release in the second territory. In some embodiments, differences in this temporal sequence may affect the allocation of revenues. As discussed above with respect to FIG. 4, in some embodiments revenue splits may include thresholds that are calculated with respect to other revenue streams, a situation known as cross-collateralization. For example, a first licensee may be entitled to recoup a minimum guarantee associated with a first stream of revenues from a second stream of revenues not included in the license. A second license may only be entitled to a share of revenues from the first stream of revenue. Depending on the grosses of the first and second streams of revenue, and the order in which they are evaluated, the second licensee may not receive any revenue.

In step 830, computer system 200 may receive user instructions from the user 130 through the user device 130A consistent with disclosed embodiments. In some embodiments, these instructions may indicate revenue sources for evaluation. For example, computer system 200 may receive an indication that user 130 selected a revenue source icon and include the corresponding revenue source in the list of revenue source controls. In some embodiments, these instructions may indicate gross revenues for the revenue source controls. In certain aspects, these instructions may indicate print and advertising expenses for the revenue source controls. In other aspects these instructions may indicate an evaluation order for the list of revenue source controls. In other embodiments, computer 200 may receive a signal to simulate the revenues according to the received user instructions.

In step 840, the computer system may provide for display the results of the simulation, consistent with disclosed embodiments. In some embodiments, the results of the simulation may include an allocation summary and revenue details by stream. In certain embodiments, the allocation summary may include an expandable tree with the top level of the tree including entries for the rights-holders, the entries including total revenue allocations for the rights holders. In some embodiments, a second level of the tree may include entries for the revenue streams, the entries including total revenue allocations for the revenue streams for the rights holders. In some embodiments, the revenue details by stream may include a waterfall chart and an allocation breakout as described with reference to FIG. 7. In some embodiments, as described with reference to FIG. 7, the waterfall and the allocation breakout may reflect the received gross and print and advertising expenses for that stream of revenue.

Figure 9:
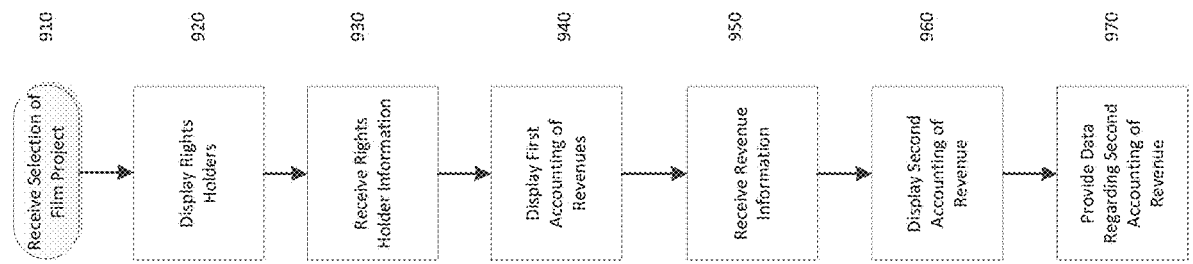
FIG. 9 depicts a flowchart of an exemplary method for tracking revenue for multiple revenues streams according to a financing model.

In FIG. 9 depicts a flowchart of an exemplary method for tracking revenue for multiple revenues streams according to a financing model consistent with disclosed embodiments. This flowchart presents an illustrative embodiment: neither sequence nor the presence of the steps is intended to limit the disclosed systems and methods. In step 910, computer system 200 receives an indication of a selected film project from user 130 through user device 130A. In some embodiments, computer system 200 may receive an indication that user 130 has selected the film project from a list control displayed in a user interface on user device 130A. In certain embodiments, this list control may be drop-down menu arranged according to a characteristic of the film project. For example, the list control may display film titles, representative images, or other identifying features. As an additional example, the list control may be sortable by film title, director name, year, and other attributes. In some embodiments, user 130 may select the film project from the list control by clicking a mouse button, using a gesture command, or other manner of user interaction known to those of skill in the art. In some embodiments, selection of the film project may include user 130 entering at least part of the film title into a text entry control displayed on the user interface provided to the user device 130A. Consistent with disclosed embodiments, computer system 200 may provide user device 130A a user interface for display of film project information. In some embodiments, film project information may include credit controls, key date controls, info digest controls, chain of rights control, allocation of receipts controls, and distribution controls.

In step 920, computer system 200 may provide user device 130A for display an expandable tree of rights holders consistent with disclosed embodiments. In some embodiments, a first level of the tree may include categories of rights holders, such as the company/entity the user is representing, the licensees that are supposed to report to this company, and the right holders this company is supposed to report to. In some aspects, a second level of the tree may include the rights holders within each category of rights holders.

In step 930, computer system 200 may receive an indication from user 130 through user device 130A of a selection of a rights holder within a category of rights holders. In some embodiments, user 130 may select the rights holder by clicking a mouse button, using a gesture command, or other manner of user interaction known to those of skill in the art.

In step 940, computer system 200 may provide user device 130A for display a first accounting of revenues consistent with disclosed embodiments. In some embodiments, the first accounting of revenues may include one or more revenue controls for displaying or entering revenue information. In some embodiments, the revenue controls may include contract controls corresponding to linked contracts. In some aspects these contract controls may include contractual information, such as at least one of a label, an amount, a payment date, and a selectable indicator of payment. In certain aspects computer system 200 may be configured to automatically populate the contract controls, according to revenue information coming from other right holders. In other aspects the computer system 200 may add additional contract controls in response to indications from the user 130 through user device 130A. In certain aspects, first accounting of revenues may include one or more entry controls for adding revenues not captured in a contract but linked to a corridor of revenues. For example, the user may need to feed a number of admissions on a particular stream of revenues because one of the right-holders' corridor of revenues is defined on the number of admissions.

In other aspects the first accounting of revenues may include an expense control for displaying or entering expense information. In some embodiments, the expense control may include an expandable tree of expenses, the items of the tree including labels, total expenses, and a running tally of expense by date. In some embodiments, computer system 200 may be configured to include additional items in the tree in response to indications from user 130 through user device 130A.

In certain aspects, the first accounting of revenues may include a statement control for displaying statements. In some embodiments, the statement control may include an expandable list of waterfall diagrams as described with reference to FIG. 7 illustrating the revenue and expenses for the revenue channel as of a certain date. In other embodiments the statement control may include an accounting of the amounts collected by the selected rights holder and the distribution of those revenues.

In step 950, computer system 200 may receive revenue information from the user 130 through user device 130A consistent with disclosed embodiments. In some embodiments, revenue information may include updated or new revenue or expense information, or revisions to existing revenue or expense information.

In step 960, computer system 200 may provide to user device 130A for display a second accounting of revenue consistent with disclosed embodiments. In some embodiments, this second account may reflect the revenue information received in step 950. For example, if the user indicated that an additional distribution contract had been signed providing the rights holder with €100,000 and that payment had been received, then the second accounting may include a waterfall control illustrating the revenue allocation for that revenue stream as of the data. As an additional example, the accounting of the amounts collected may reflect the additional revenue of €100,000.

In step 970, computer system 200 may provide data regarding the second accounting of revenue for printing, saving, transmittal, or other methods of outputting data known to one of skill in the art.

Figure 10:
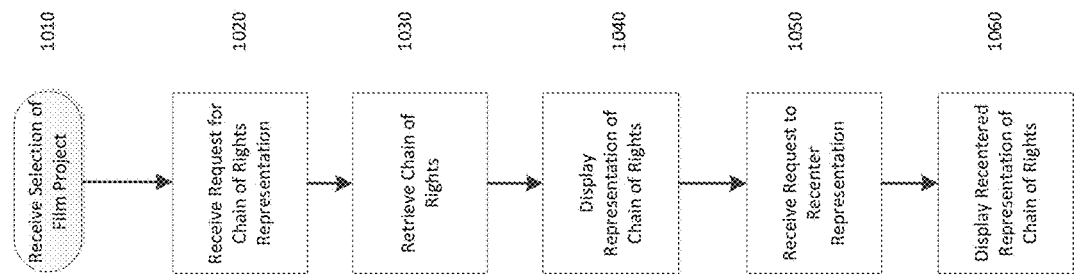
FIG. 10 depicts a flowchart of an exemplary method for managing a chain of rights.

FIG. 10 depicts a flowchart of an exemplary method for displaying a chain of rights. This flowchart presents an illustrative embodiment: neither sequence nor the presence of the steps is intended to limit the disclosed systems and methods. In step 1010, computer system 200 receives an indication of a selected film project from user 130 through user device 130A. In some embodiments, in response to this indication computer system 200 may be configured to provide user device 130A a user interface for display of film project information. In some embodiments, film project information may include credit controls, key date controls, info digest controls, chain of rights control, allocation of receipts controls, and distribution controls.

In step 1020, computer system 200 receives an indication to provide a representation of the chain of rights for the selected film project consistent with disclosed embodiments. In some embodiment this indication may include a selection by the user 130 of the chain of rights control displayed on user device 130A.

In step 1030, computer system may retrieve the chain of rights stored in memory 210. In some embodiments, the chain of rights may include contracts in force between rights-holders. In other embodiments, the chain of rights may include proposed contracts between rights-holders.

In step 1040, computer system 200 may display a tree layout for the chain of rights consistent with disclosed embodiments. In some embodiments, computer system 200 may be configured to space the first-tier nodes of the chain of rights approximately equally around a central node. In some embodiments, the central node may be determined by default. In some embodiments, computer system 200 may determine the central node in response to an indication from the user through user device 130A. In some embodiments an identifier of the rights-holder, such as a name, may be displayed around the central node. In certain aspects computer system 200 may be configured to display information proximate to nodes or lines connecting the nodes, such as an identifier for a rights-holder, or contract information such as an identifier or date associated with a contract. The computer may be configured to provide to the user device 130A for display a user interface that, when the mouse cursor is placed near a node or line, emphasizes a node or line or displays further information.

In step 1050, the computer system may receive an indication to re-center the tree of rights consistent with disclosed embodiments. In some embodiments, the indication may be received from the user 130 through the user control 130A. In certain embodiments the user 130 may indicate a selection of a rights-holder by clicking a mouse button, using a gesture command, or other manner of user interaction known to those of skill in the art.

In step 1060, computer system 200 may re-center the tree of rights consistent with disclosed embodiments. In some embodiments, computer system 200 may be configured to provide to user device 130A for display another tree of rights with the selected node as the center node. In some embodiments, steps 1050 and 1060 may be repeated. In some embodiments, computer system 200 may receive indications to edit the information proximate to nodes or lines from user 130 through user device 130A. In such embodiments, computer system 200 may be configured to provide an edited tree of rights to user device 130A for display. In some embodiments, computer system 200 may be configured to store an edited tree of rights in memory 210 upon receipt of an indication from user device 130A.

Figure 11:
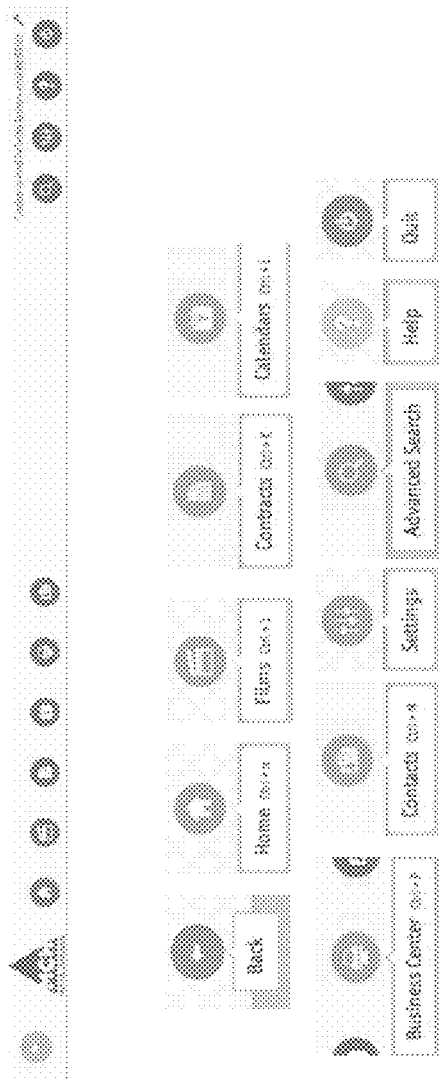
FIG. 11 depicts an exemplary home menu bar.

FIG. 11 shows an exemplary home menu bar, listing certain features consistent with disclosed embodiments. These features include viewing a list of films, managing contracts, and viewing calendars. A selectable icon corresponding to each feature is displayed.

Figure 12:
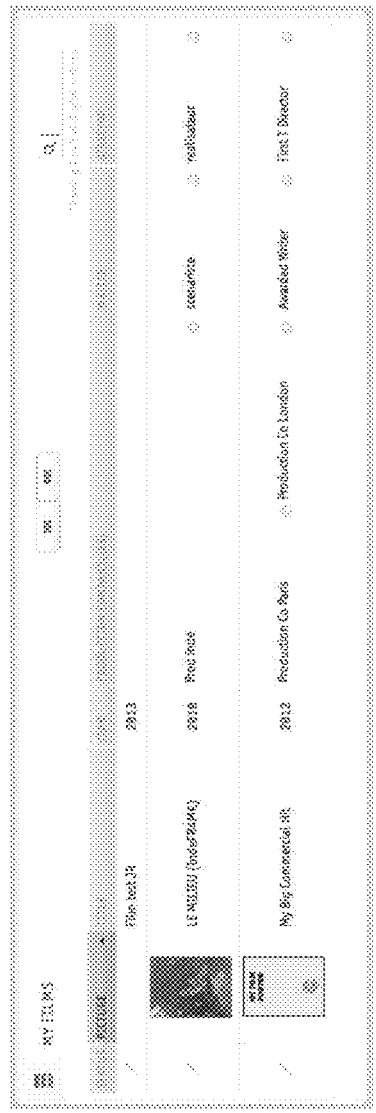
FIG. 12 depicts an exemplary listing of film titles and associated information.

FIG. 12 shows an exemplary listing of film titles and associated information, such as the year it was created, the production companies involved, and names of the writers and director consistent with disclosed embodiments. Access to certain films can be restricted. For instance, a user who has not created the film may only see its title and production year but cannot access more information about it. A red lock in the "status" column indicates that a film has restricted access. If a user has imported a photo as the poster of the film, it may appear in the list. The film information may be linked to various public or private databases, such as Rentrak or Cinando.

Figure 13:
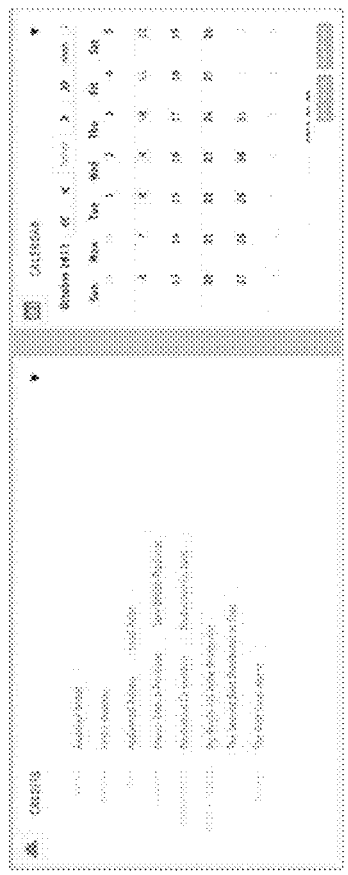
FIG. 13 depicts an association of a film with one or more credits.

FIG. 13 shows an association of a film with one or more credits, consistent with disclosed embodiments. In some embodiments, these credits may include the film's writer, director, cast, producer, production company, distribution company, and sales company. Each category of credits may include multiple individuals or companies. The user may add a profile or a company to the credits by typing its name and selecting it in the list of suggestions that appear below. If the rights-holder the user is seeking does not appear in the list, the application may store it for future use. These credits may be synchronized with public and private databases, such as the Rentrak or Cinando.

Figure 14:
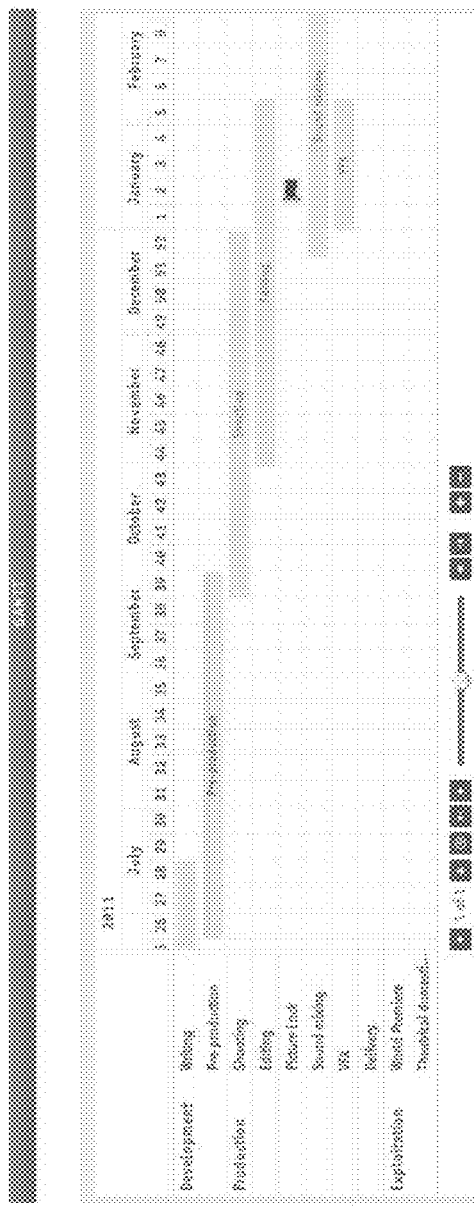
FIG. 14 depicts an exemplary calendar for the development, production, and exploitation for a selected film.

FIG. 14 shows an exemplary calendar for the development, production, and exploitation for a selected film consistent with disclosed embodiments. The calendar shows the events linked to the film, including the dates of contracts, meetings, release date, etc. In some embodiments, the computer system 200 may be configured to populate this calendar based in part on the linked contracts. For example, the calendar may be populated based on conditions precedent in the linked contracts. The user may elect to view a calendar for multiple film projects superimposed. The user may also elect to view only a type or some types of event(s) for the selected project(s).

Figure 15:
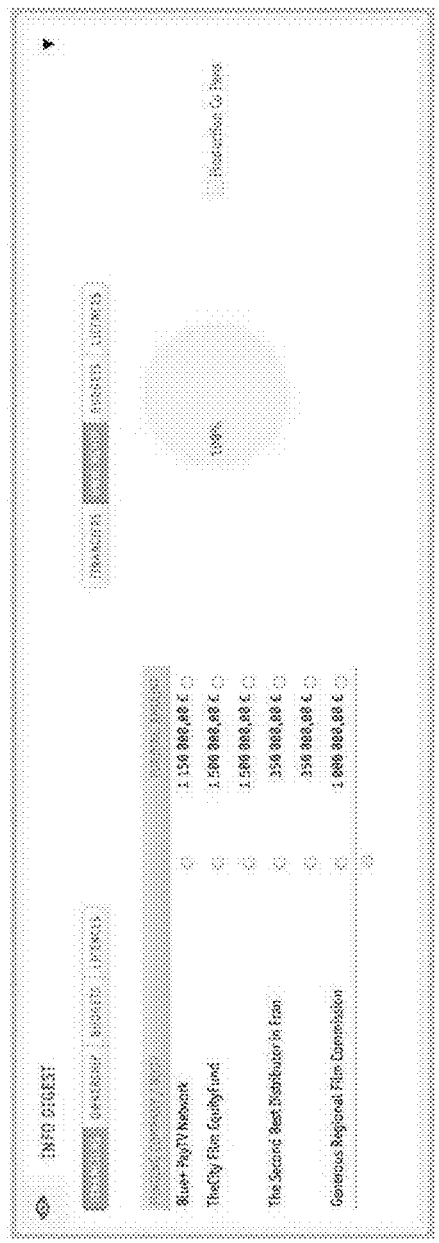
FIG. 15 depicts an exemplary digest of the business information for a selected film.

FIG. 15 shows an exemplary digest of the business information for a selected film consistent with disclosed embodiments. As a non-limiting example, the "financiers" option is selected. Thus, in this embodiment, several funding companies, such as "My British EIS financier", may be listed, along with their respective funding amounts for the film. Other options, such as "ownership", "product budget", "cash flow", and "licenses" may also be selected.

Figure 16:
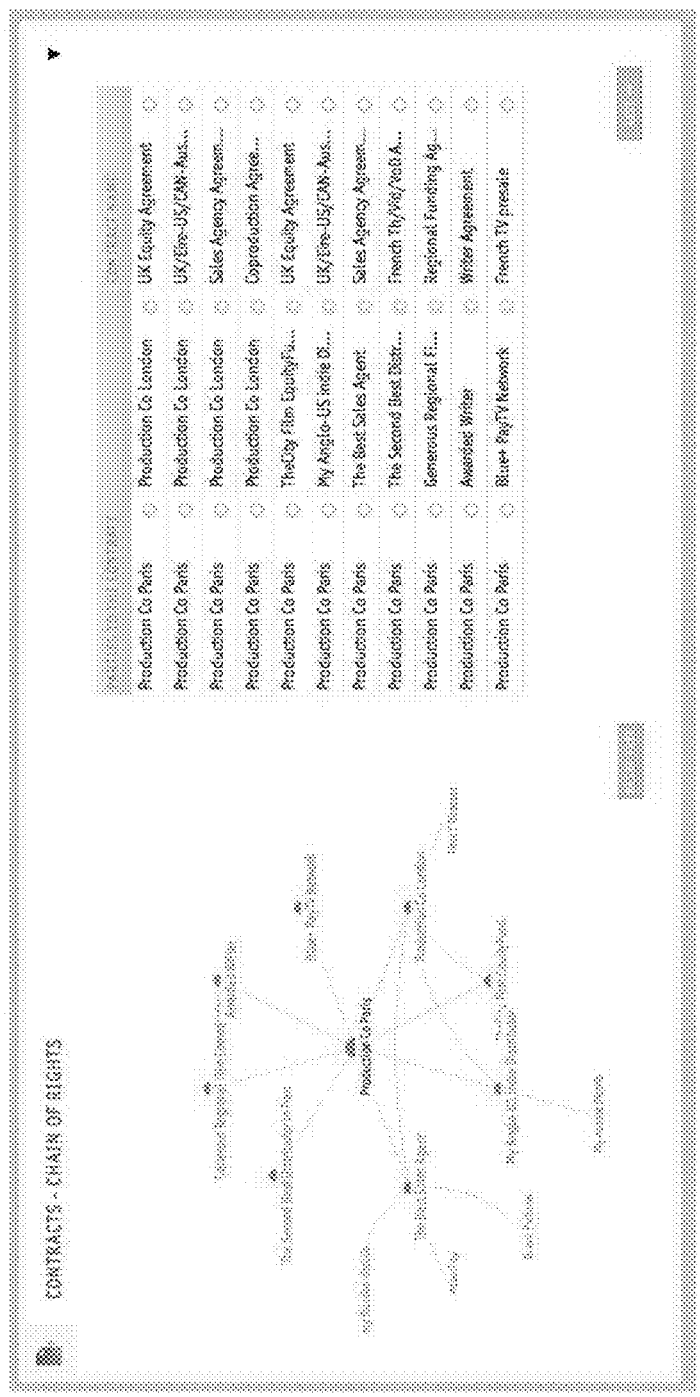
FIG. 16 depicts an exemplary chart of the chain of rights for a selected film.

FIG. 16 shows an exemplary chart of the chain of rights for a selected film as described in detail with regard to FIG. 10, consistent with disclosed embodiments. The tree, or "spider", may enable the user to visualize the contractual links between all the profiles and companies which participate in the making and exploiting of the film. When the user selects on a particular rights-holder, such as "My French production co.", the tree may re-center on the rights-holder to display contracts relating to that rights-holder. The user may also visualize the entire chain of rights as a list of contracts.

Figure 17:
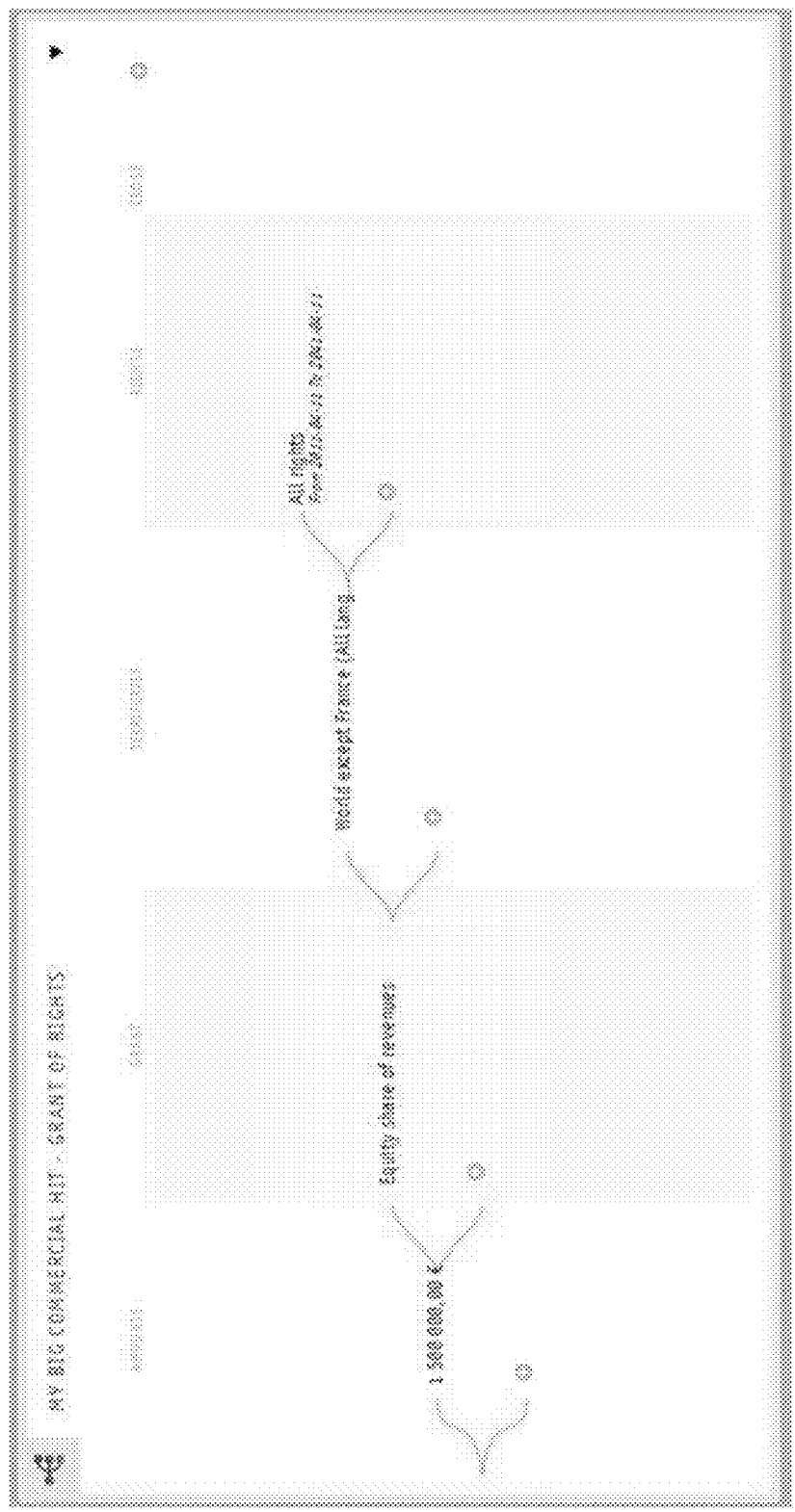
FIG. 17 shows an exemplary tree of rights.

FIG. 17 shows an exemplary tree of rights consistent with disclosed embodiments. In some embodiments, as shown, the tree of rights may include nodes for amount, grant, territory, media, and potentially cross-collateralization. In certain embodiments, the order of the nodes may differ from the order shown. In some aspects, additional nodes or fewer nodes may be present. In some embodiments, the computer may be configured to add a branch to a node in response to an indication from user 130 received from user device 130A. For example, as shown in the non-limiting example given in FIG. 17, the user 130 may select a plus sign indication in the user interface displayed by user device 130A to add another branch to a node.

Figure 18:
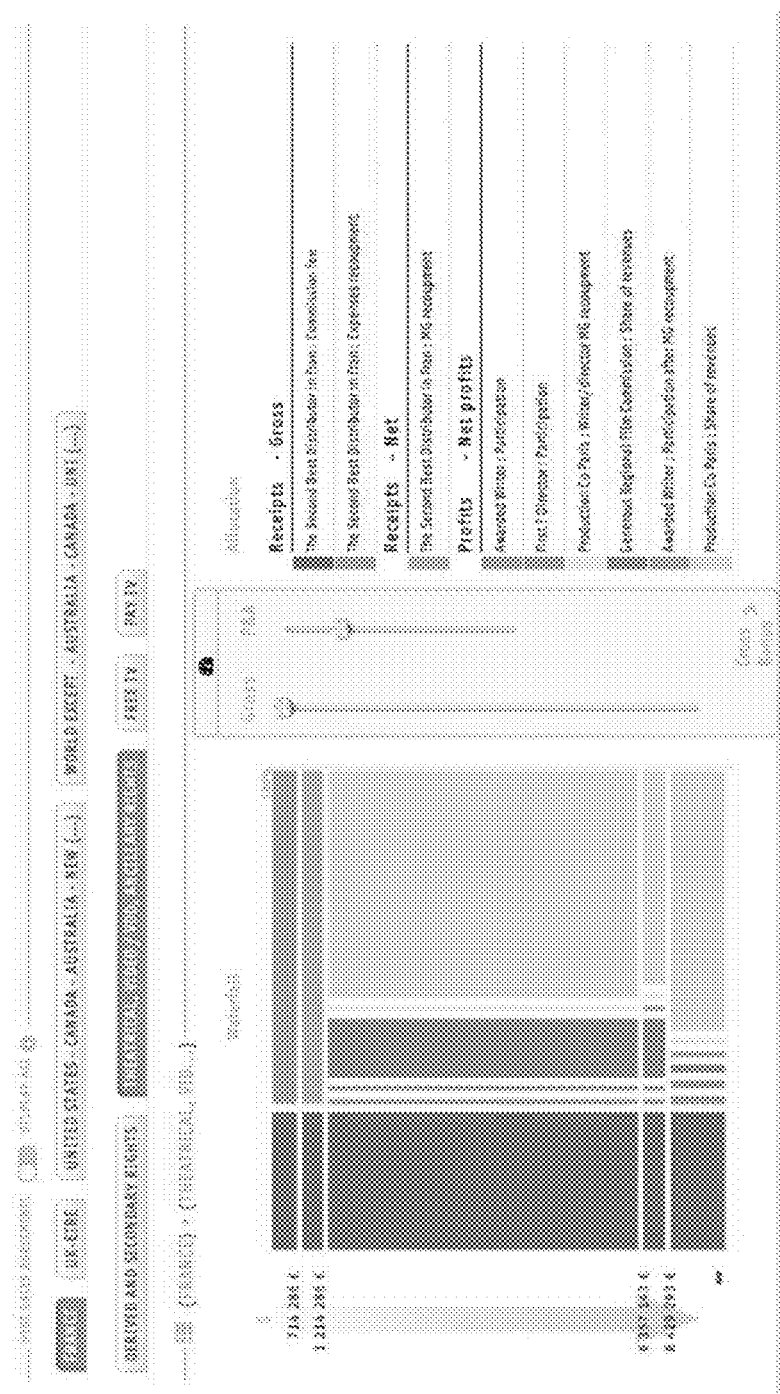
FIG. 18 depicts an exemplary waterfall chart to visualize the allocation of potential receipts for a selected film.

FIG. 18 shows an exemplary waterfall chart to visualize the allocation of disbursed receipts for a selected film as described in detail with regard to FIG. 7, consistent with disclosed embodiments. The chart uses contractual information to determine the allocation of receipts among various parties given the gross receipts and amount spent on prints and advertising. The width of each colored rectangle in the waterfall corresponds to a monetary amount. The user may elect to view a particular geographic territory. In FIG. 18, "World, except UK, France, Americas, Australia, NZ" has been selected. The user may further select a set of rights. Such rights may include, as a non-limiting example, showing the film in theatres, on television, or in DVD format, or any combination of these rights. In FIG. 18, "all rights" has been selected. On the right, the legend tells the user which color corresponds to which rights-holder and from which base they obtain their revenue. On the left, the waterfall shows the share of receipts granted to each rights-holder depending on the gross receipts of the film and the distribution and exploitation expenses. By sliding up and down the button below "Gross" and "P&A", the sizes of the rectangles in the waterfall automatically adjust to reflect the changes in revenues brought by a change in receipts and expenses. The waterfall chart may be used, for instance, during the contract negotiations among various interested parties so that the participants may easily visualize their share of the profits from a particular film project. This unified intuitive and visual representation enables participants save time during these contract negotiations.

Figure 19:
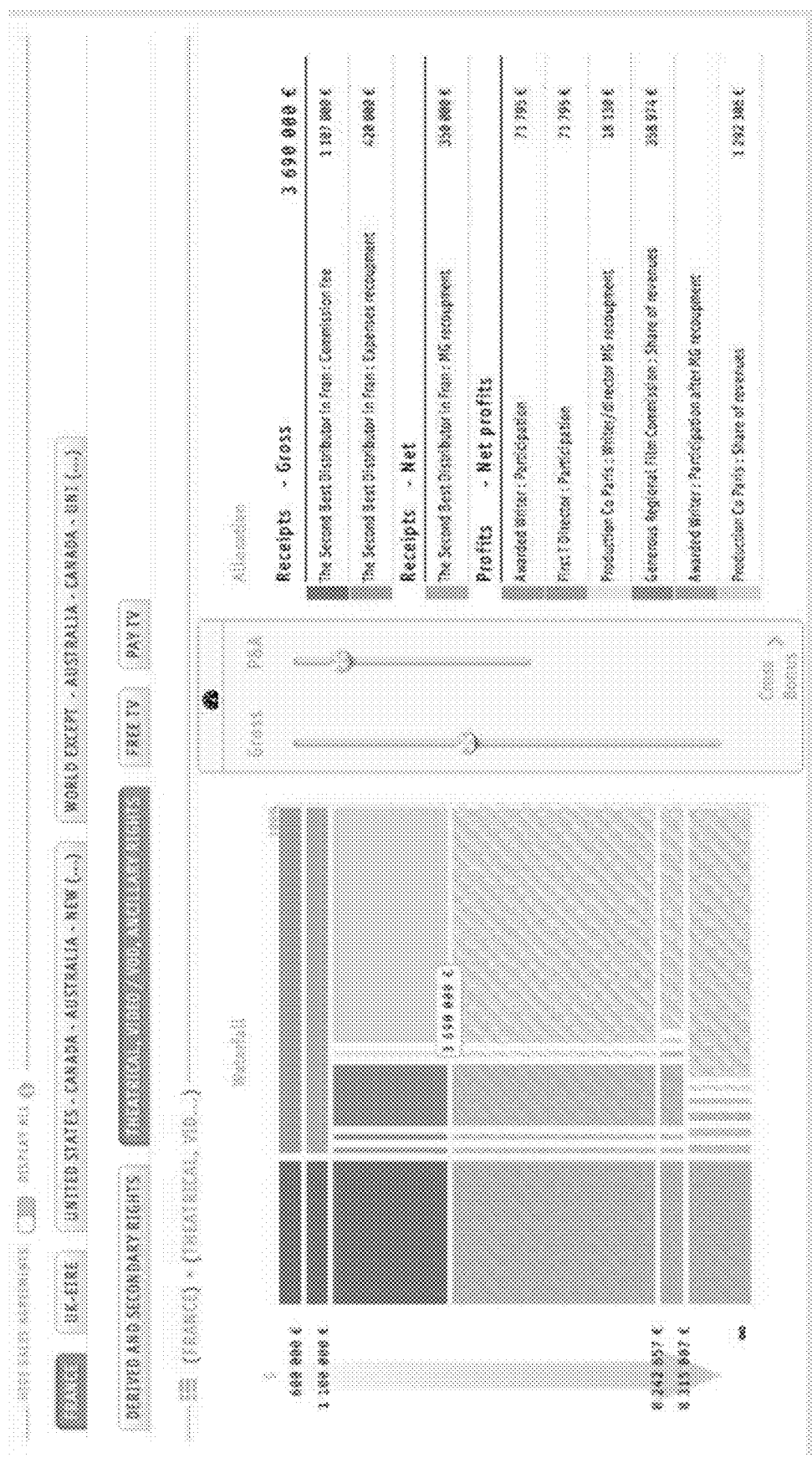
FIG. 19 shows an exemplary waterfall chart to visualize the allocation of receipts for a selected film and a given amount of gross receipts.

FIG. 19 shows an exemplary waterfall chart to visualize the allocation of receipts for a selected film and a given amount of gross receipts consistent with disclosed embodiments. In this chart, solid colors indicate receipts already earned by rights-holders, and grayed colors indicate projected allocations should further receipts arrive. Similar to the waterfall shown in FIG. 17, the user may select a geographic territory and set of rights. The user may slide the buttons below "Gross" and "P&A" to observe how the allocations change as those values are adjusted.

Figure 20:
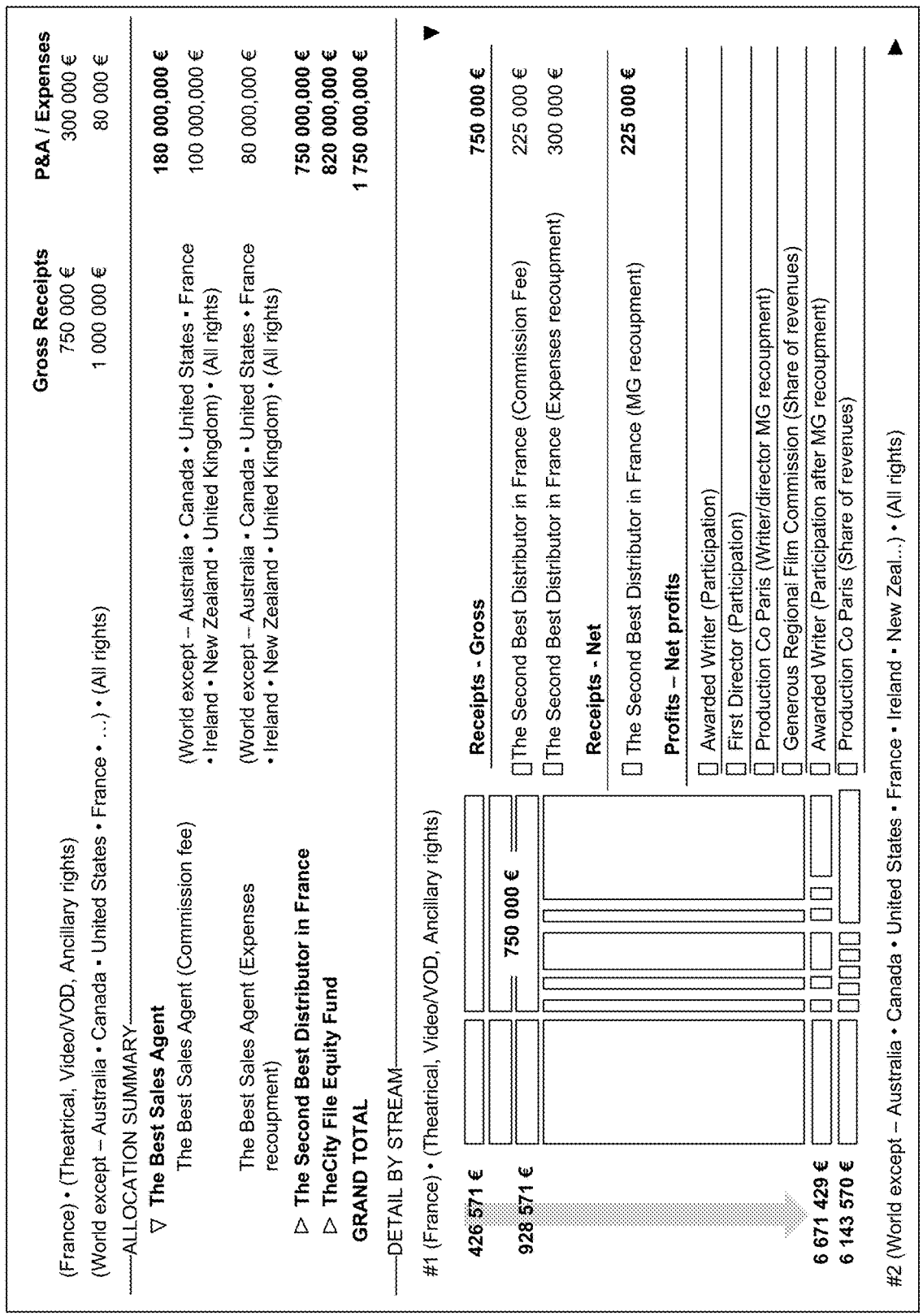
FIG. 20 depicts a simulation of the total allocation of projected receipts.

FIG. 20 shows a simulation of the total allocation of projected receipts consistent with disclosed embodiments. In some embodiments, a simulation tool may enable the user to estimate, for a given territory and support, the allocation of receipts between the rights-holders who participated in the making and exploiting of the film. The user may select, via a pop-up, the territory and type of receipts. The territory may be chosen among the territories used for contracts related to the film. The conversion rate may be used to convert physical units or numbers of admission into monetary receipts. The user may then indicate the number of admissions/DVDs sold or receipts and the expenses the user wishes to consider for the simulation. The user may add an unlimited number of streams. The user may then view the waterfall of the allocation of receipts for the territory, receipts and expenses taken into account for the simulation.

Figure 21:
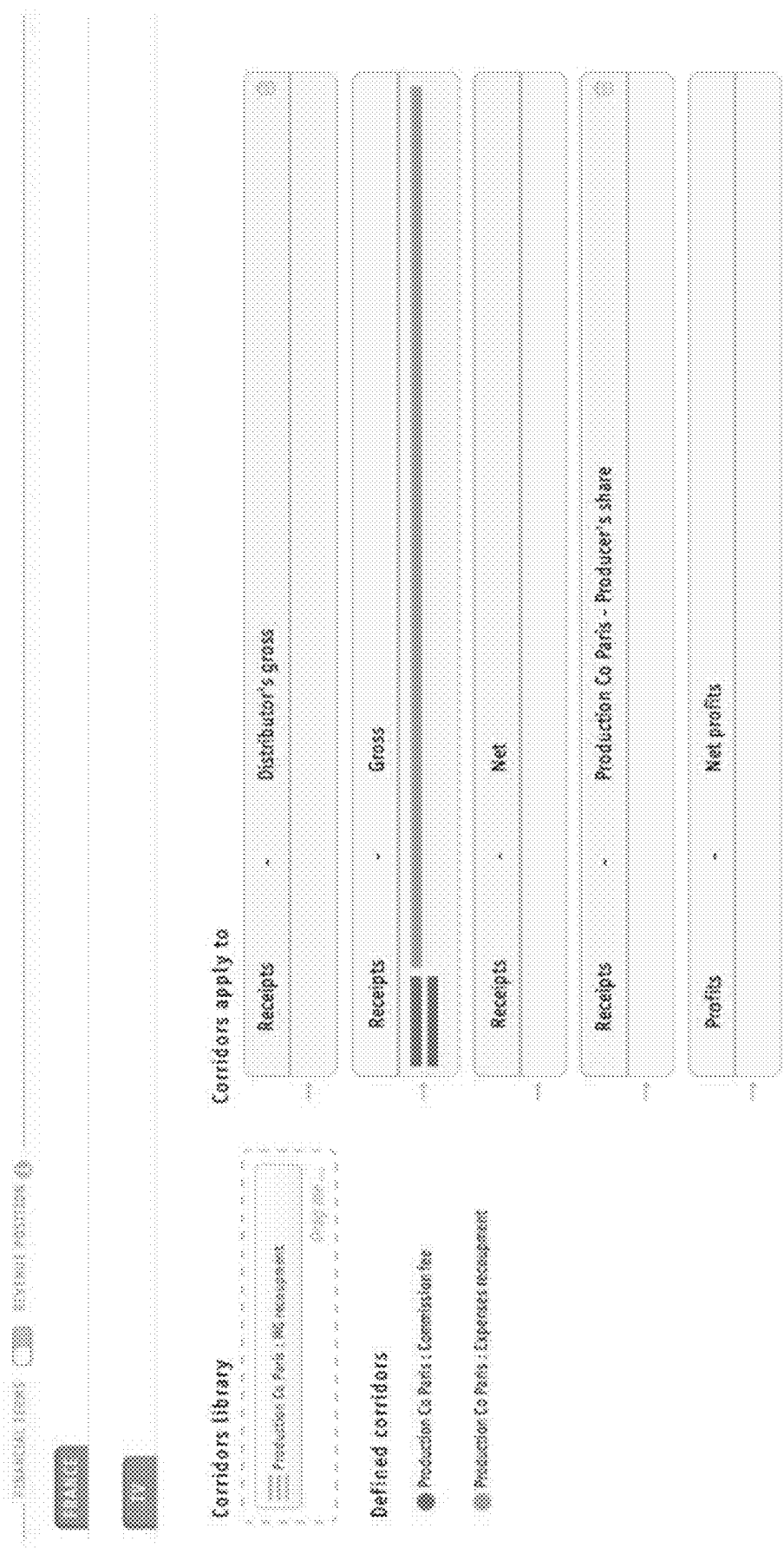
FIG. 21 depicts an exemplary drag-and-drop editing interface for the allocation of receipts.

FIG. 21 shows an exemplary drag-and-drop editing interface for the allocation of receipts consistent with disclosed embodiments. In the gray box with a dotted outline appear the rights of the licensee (or licensor in the case of a transfer of underlying rights). In the example in FIG. 21, the box indicated the equity share of receipts. On the right are the different types of receipts, including gross receipts, net receipts, and producer's share, where the blocks of color symbolize the share already given to another party pursuant to other agreements on the film. The user may drag and drop the gray box onto the type of receipts for which the licensor or licensee has a right. A pop-up may then appear, where the user may fill in the specifications of the deal.

Figure 22:
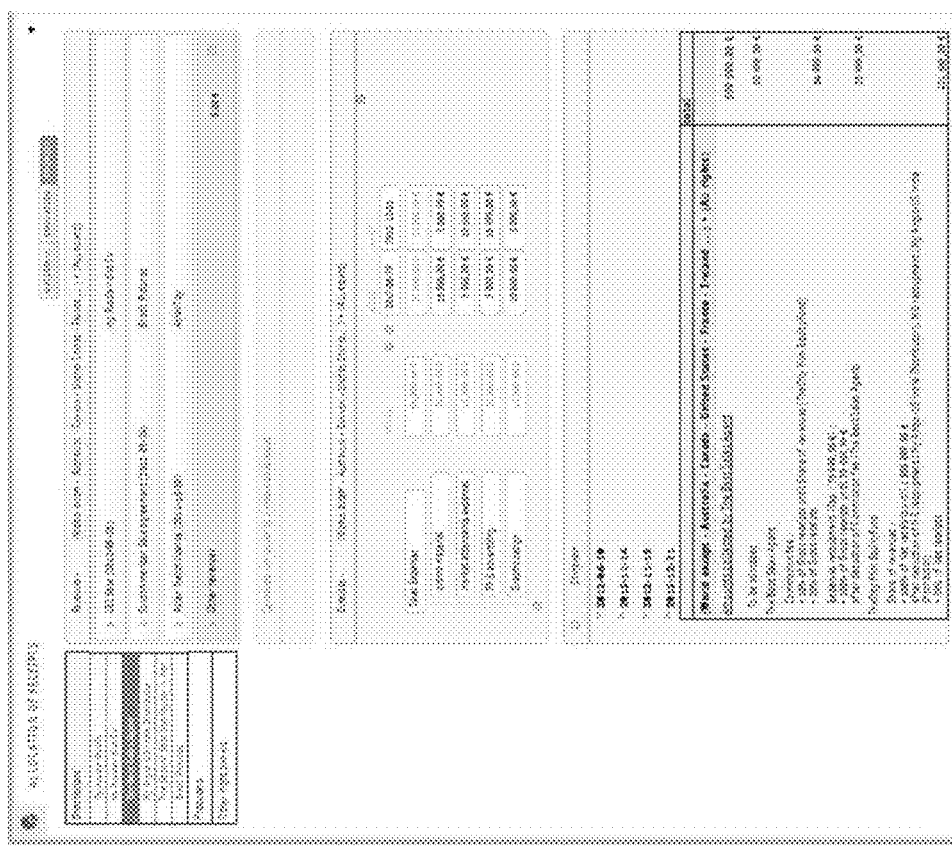
FIG. 22 depicts an exemplary text-based editing interface for the allocation of receipts.

FIG. 22 shows an exemplary text-based editing interface for the allocation of receipts consistent with disclosed embodiments. On the left, the distributors, producers, and financiers are listed. When a particular party is selected, the provisional and real amounts collected are shown, partitioned by geographic territory and rights. The user may directly edit these amounts.

Figure 23:
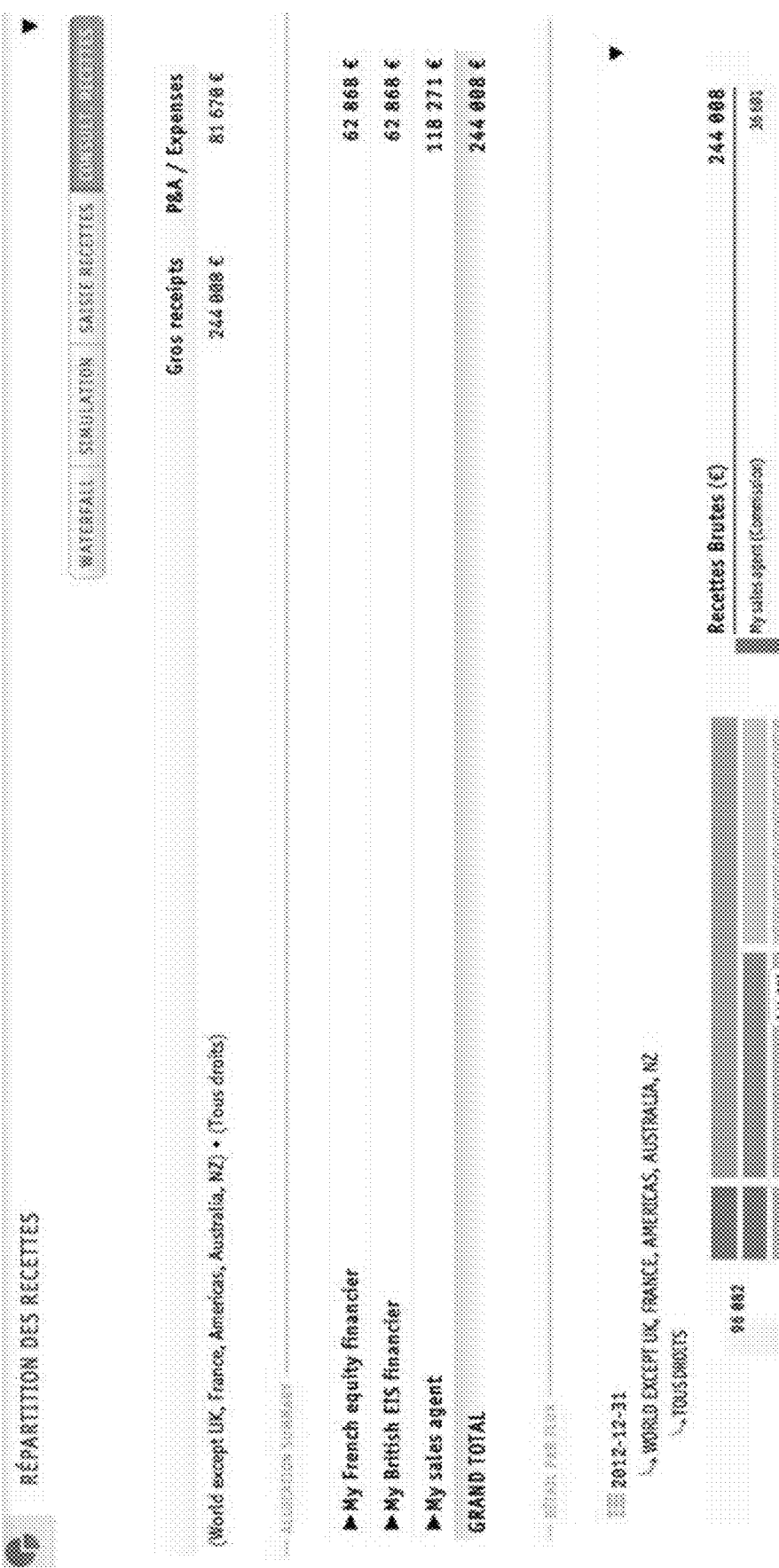
FIG. 23 depicts an exemplary view of the allocation of receipts.

FIG. 23 shows an exemplary view of the allocation of receipts consistent with disclosed embodiments. The user may view the allocation of the receipts already edited and the waterfall of said allocation in the "View Receipts" section.

Figure 24:
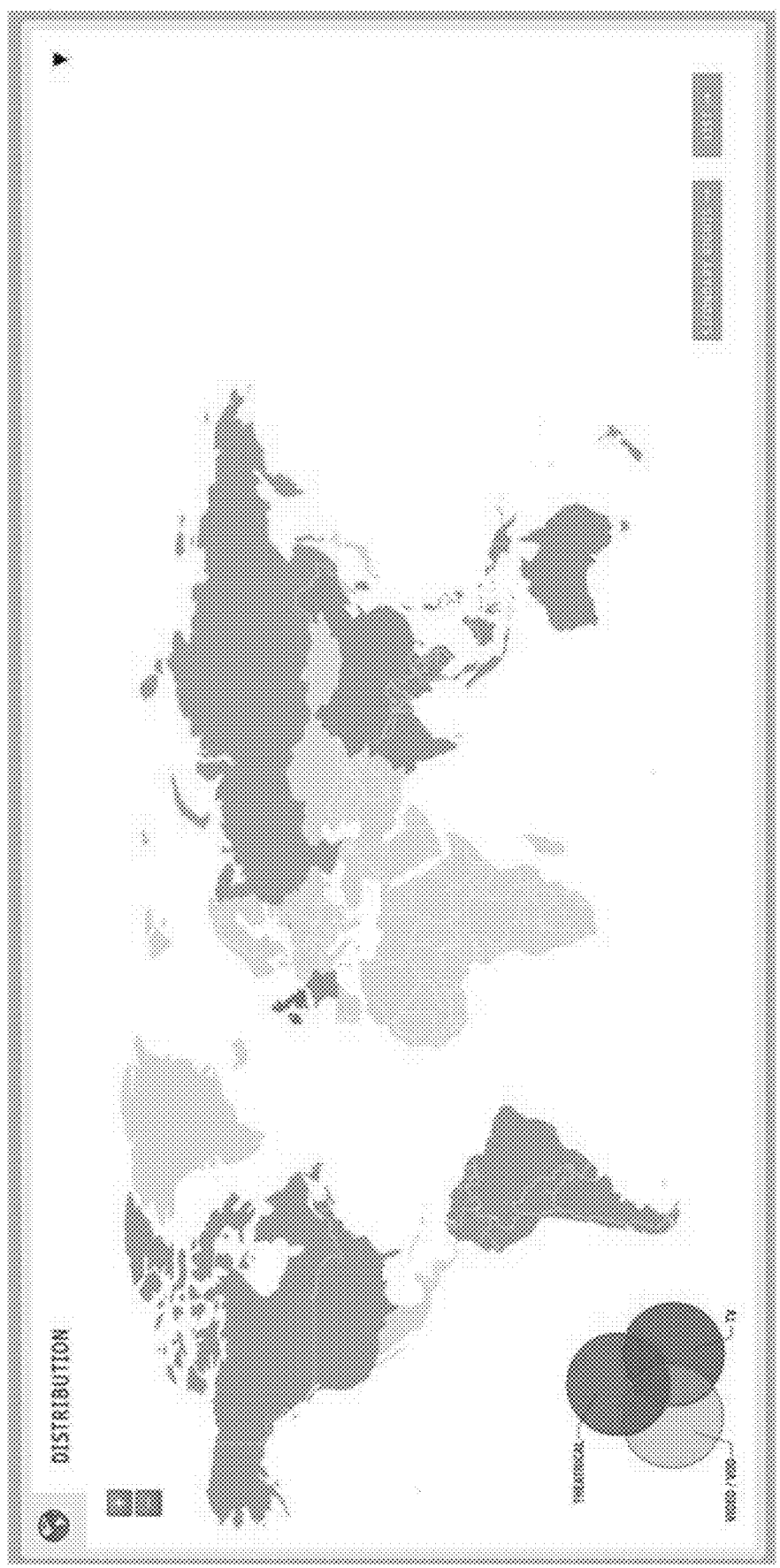
FIG. 24 depicts an exemplary map indicating the primary rights for a selected film in various territories around the world.

FIG. 24 shows an exemplary map indicating the primary rights for a selected film in various territories around the world consistent with disclosed embodiments. A similar map may be shown for secondary rights. Countries that appear in color are those for which an exploitation contract has been signed. The legend in the lower left shows which color corresponds to which combination of rights. For instance, Australia is orange, which indicates that in Australia, the selected film may be viewed on video and TV, but may not be viewed in the movie theatre.

Figure 25:
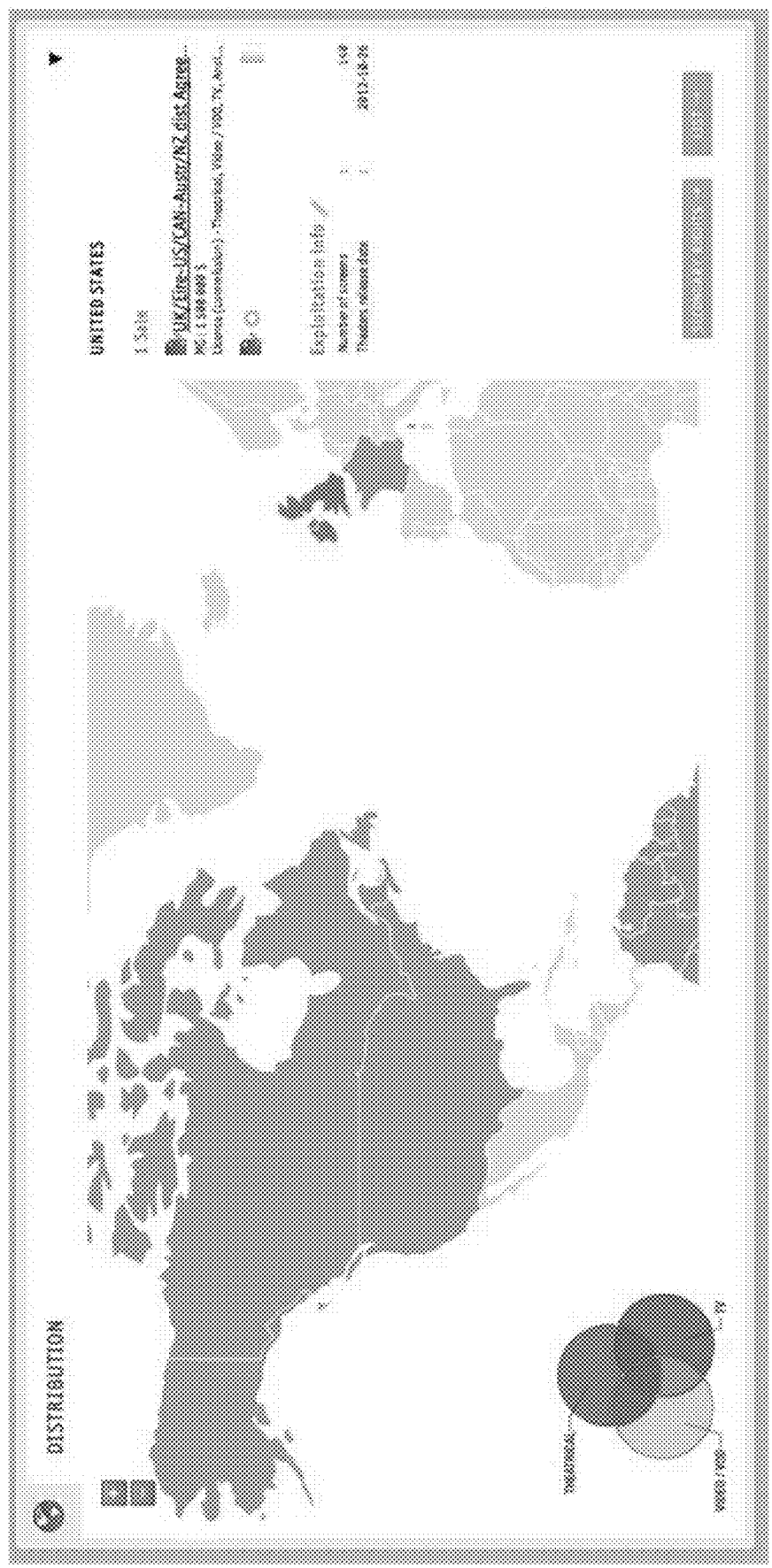
FIG. 25 depicts an exemplary map indicating the primary rights by geographic territory consistent with disclosed embodiments.

FIG. 25 shows an exemplary map indicating the primary rights for a selected film in various territories around the world, along with a list of contracts associated with a selected territory consistent with disclosed embodiments. By clicking on a country in color, the user may view which contract is associated with it. The user may add a new sale or add exploitation information by clicking on the relevant link in the contract list and entering information in a pop-up.

FIG. 26 shows a list of exploitation contracts for a selected film consistent with disclosed embodiments. For each contract, the date, any tags, the name of the licensee, the applicable territory, the licensed rights, and the amounts are shown. The subtotal and grand totals for all contracts are shown as well. The list may also be sorted by clicking on the attribute name in the top row.

FIG. 27 shows a list of contracts for a selected user consistent with disclosed embodiments. For each rightsholder, the date, reference number, name, transferor, assignee, and type are shown. The tool includes a search bar to find contracts that have certain keywords. The list may also be sorted by clicking on the attribute name in the top row.

Figure 28:
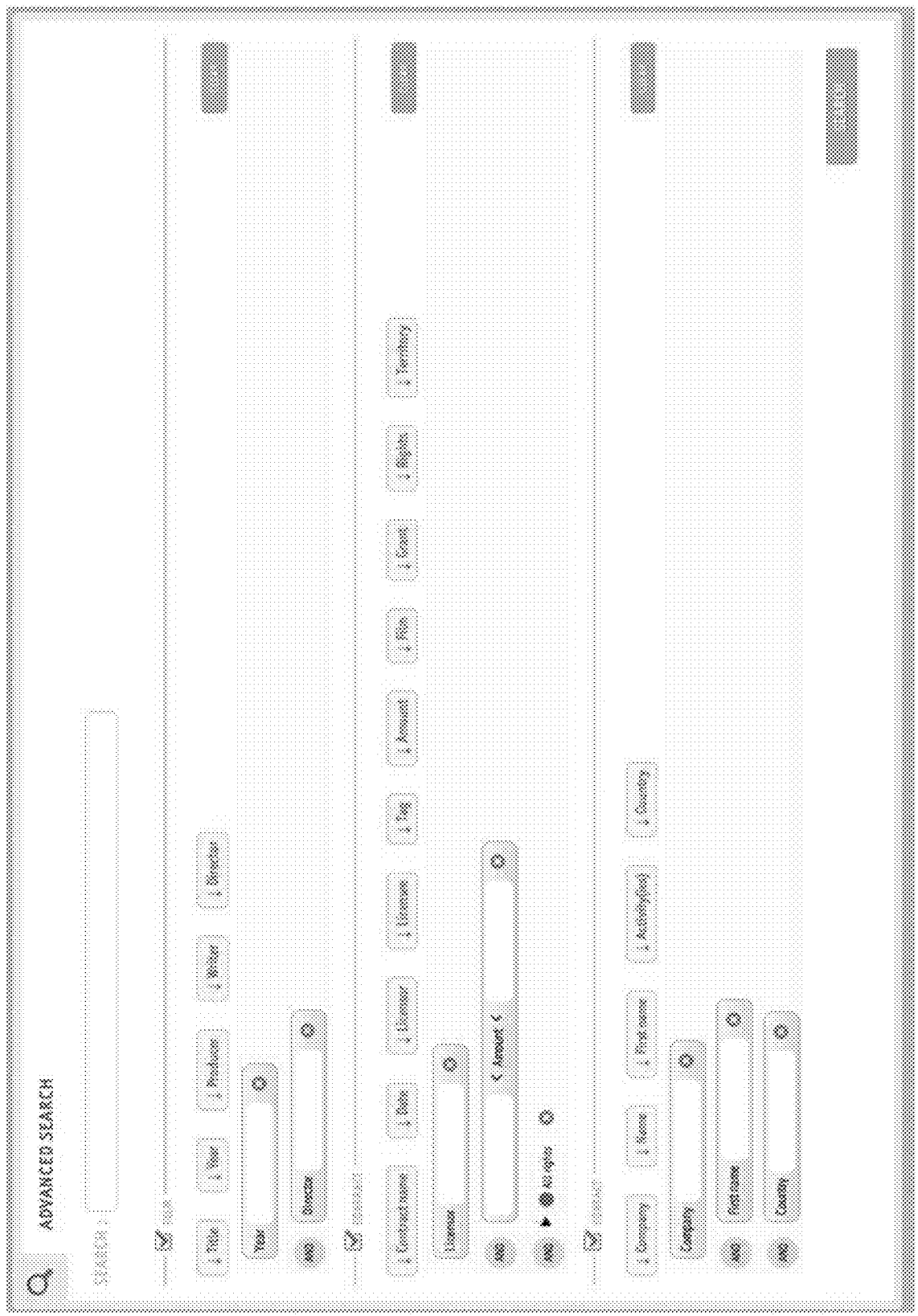
FIG. 28 depicts an exemplary interface of an advanced search according to multiple criteria.

FIG. 28 shows an exemplary interface of an advanced search according to multiple criteria consistent with disclosed embodiments. For each search category (film, contract and contact), there is a list of criteria that you can use to find the exact film, contract or contact. The user may choose to use as many criteria as he wants.

FIG. 29 shows an exemplary view of the statement and distribution record for a selected film in various territories around the world consistent with disclosed embodiments. The user selects a specific film, a specific contract, and a specific time frame. A window pops up with the required information and offers the possibility to edit the displayed information before printing them.

FIG. 30 shows an exemplary view of record and availabilities of rights consistent with disclosed embodiments. In some embodiments, computer system 200 may provide to user device 130A for display a user interface showing licensed and available rights relating to the film project. In certain embodiments, computer system 200 may be configured to provide such a user interface in response to an indication of at least one of a film, a licensor, a territory or a media right. In some embodiments, computer system 200 may provide to user device 130A for display an indication that the specific rights are available for licensing. In other embodiments, computer system 200 may provide an indication of the chain of rights displaying the rights holders associated with at least one of the film, licensor, territory or media right. In some embodiments, computer system 200 may provide data regarding the recorded and available rights for printing, saving, transmittal, or other methods of outputting data known to one of skill in the art.

The foregoing description, along with its associated embodiments, has been presented for purposes of illustration only. It is not exhaustive and does not limit the inventions to the precise form disclosed. Those skilled in the art will appreciate from the foregoing description that modifications and variations are possible in light of the above teachings or may be acquired from practicing the inventions. The steps described need not be performed in the same sequence discussed or with the same degree of separation. Likewise various steps may be omitted, repeated, or combined, as necessary, to achieve the same or similar objectives. Accordingly, the inventions are not limited to the above-described embodiments, but instead is defined by the appended claims in light of their full scope of equivalents.

What is claimed is:

1. A non-transitory computer-readable medium containing instructions that, that when executed by a processor of a system, cause the system to perform operations comprising:
   displaying a graphical user interface comprising:
      an adjustable waterfall chart comprising a graphical region having a proportion axis and an amount axis, the graphical region partitioned into adjacent value bars at least in part by a first waterfall threshold paralleling the proportion axis and intersecting the amount axis, a first value bar of the adjacent value bars partitioned into adjacent value boxes by at least one second waterfall threshold paralleling the amount axis and intersecting the first waterfall threshold;
      wherein a variable waterfall threshold paralleling the proportion axis and intersecting the amount axis further divides the graphical region into value bars having a first color characteristic and value bars having a second color characteristic;
      a sub-control that determines the intersection of the variable waterfall threshold with the amount axis, the sub-control comprising a slider, a position of the slider corresponding to the intercept of the variable waterfall threshold; and
      an allocation breakout comprising a list of groups of value boxes, each entry in the list including an indication of the corresponding group of value boxes and an amount associated with the corresponding group of value boxes; and
   detecting a user interaction with the sub-control, detecting the user interaction comprising detecting an updated position of the slider; and updating, based on the detected user interaction, the first view of the graphical user interface, the updating comprising:
adjusting the intercept of the variable waterfall threshold; and
adjusting the amounts associated with the corresponding groups of value boxes in the allocation breakout.

2. The non-transitory computer-readable medium of claim 1, wherein the updating comprises aligning the intercept of the variable waterfall threshold and the updated position of the slider.

3. The non-transitory computer-readable medium of claim 1, wherein the graphical user interface includes a geographic control and the adjustable waterfall chart depends on a value of the geographic control.

4. The non-transitory computer-readable medium of 1, wherein the graphical user interface includes a second control and the adjustable waterfall chart depends on a value of the second control.

5. The non-transitory computer-readable medium of 1, wherein a height of the first value bar is dependent on an amount associated with the first value bar.

6. The non-transitory computer-readable medium of claim 1, wherein the adjacent value boxes comprise a first value box, a width of the first value box being dependent on a proportion, the proportion being the proportion of an amount associated with the first value bar that is associated with the first value box.

7. The non-transitory computer-readable medium of claim 1, wherein the amount axis is labeled at a position corresponding to the intersection of the variable waterfall threshold with the amount axis with an amount corresponding to the variable waterfall threshold.

8. The non-transitory computer-readable medium of claim 1, wherein the sub-control is disposed within an assumptions control adjacent to the adjustable waterfall chart.

9. A system comprising:
a processor;
a memory containing instructions, that when executed by the processor, cause the system to perform operations comprising:
displaying a graphical user interface comprising:
an adjustable waterfall chart comprising a graphical region having a proportion axis and an amount axis, the graphical region partitioned into adjacent value bars at least in part by a first waterfall threshold paralleling the proportion axis and intersecting the amount axis, a first value bar of the adjacent value bars partitioned into adjacent value boxes by at least one second waterfall threshold paralleling the amount axis and intersecting the first waterfall threshold;
wherein a variable waterfall threshold paralleling the proportion axis and intersecting the amount axis further divides the graphical region into value bars having a first color characteristic and value bars having a second color characteristic;
a sub-control that determines the intersection of the variable waterfall threshold with the amount axis, the sub-control comprising a slider, a position of the slider corresponding to the intercept of the variable waterfall threshold; and
an allocation breakout comprising a list of groups of value boxes, each entry in the list including an indication of the corresponding group of value boxes and an amount associated with the corresponding group of value boxes; and
detecting a user interaction with the sub-control, detecting the user interaction comprising detecting an updated position of the slider; and
updating, based on the detected user interaction, the first view of the graphical user interface, the updating comprising:
adjusting the intercept of the variable waterfall threshold; and
adjusting the amounts associated with the corresponding groups of value boxes in the allocation breakout.

10. The system of claim 9, wherein the updating comprises aligning the intercept of the variable waterfall threshold and the updated position of the slider.

11. The system of claim 9, wherein the graphical user interface includes a geographic control and the adjustable waterfall chart depends on a value of the geographic control.

12. The system of claim 9, wherein the graphical user interface includes a second control and the adjustable waterfall chart depends on a value of the second control.

13. The system of claim 9, wherein a height of the first value bar is dependent on an amount associated with the first value bar.

14. The system of claim 9, wherein the adjacent value boxes comprise a first value box, a width of the first value box being dependent on a proportion, the proportion being the proportion of an amount associated with the first value bar that is associated with the first value box.

15. The system of claim 9, wherein the amount axis is labeled at a position corresponding to the intersection of the variable waterfall threshold with the amount axis with an amount corresponding to the variable waterfall threshold.

16. The system of claim 9, wherein the sub-control is disposed within an assumptions control adjacent to the adjustable waterfall chart.

* * * * *